Nov. 23, 1965   A. P. ROGERS   3,219,345
SELECTIVE PINSETTING CONTROL
Filed Sept. 4, 1962   14 Sheets-Sheet 1

INVENTOR.
BY Albert P. Rogers
Hofgren, Brady,
Wegner, Allen & Stellman
Attys.

Nov. 23, 1965  A. P. ROGERS  3,219,345
SELECTIVE PINSETTING CONTROL
Filed Sept. 4, 1962  14 Sheets-Sheet 3

Nov. 23, 1965  A. P. ROGERS  3,219,345
SELECTIVE PINSETTING CONTROL
Filed Sept. 4, 1962  14 Sheets-Sheet 4

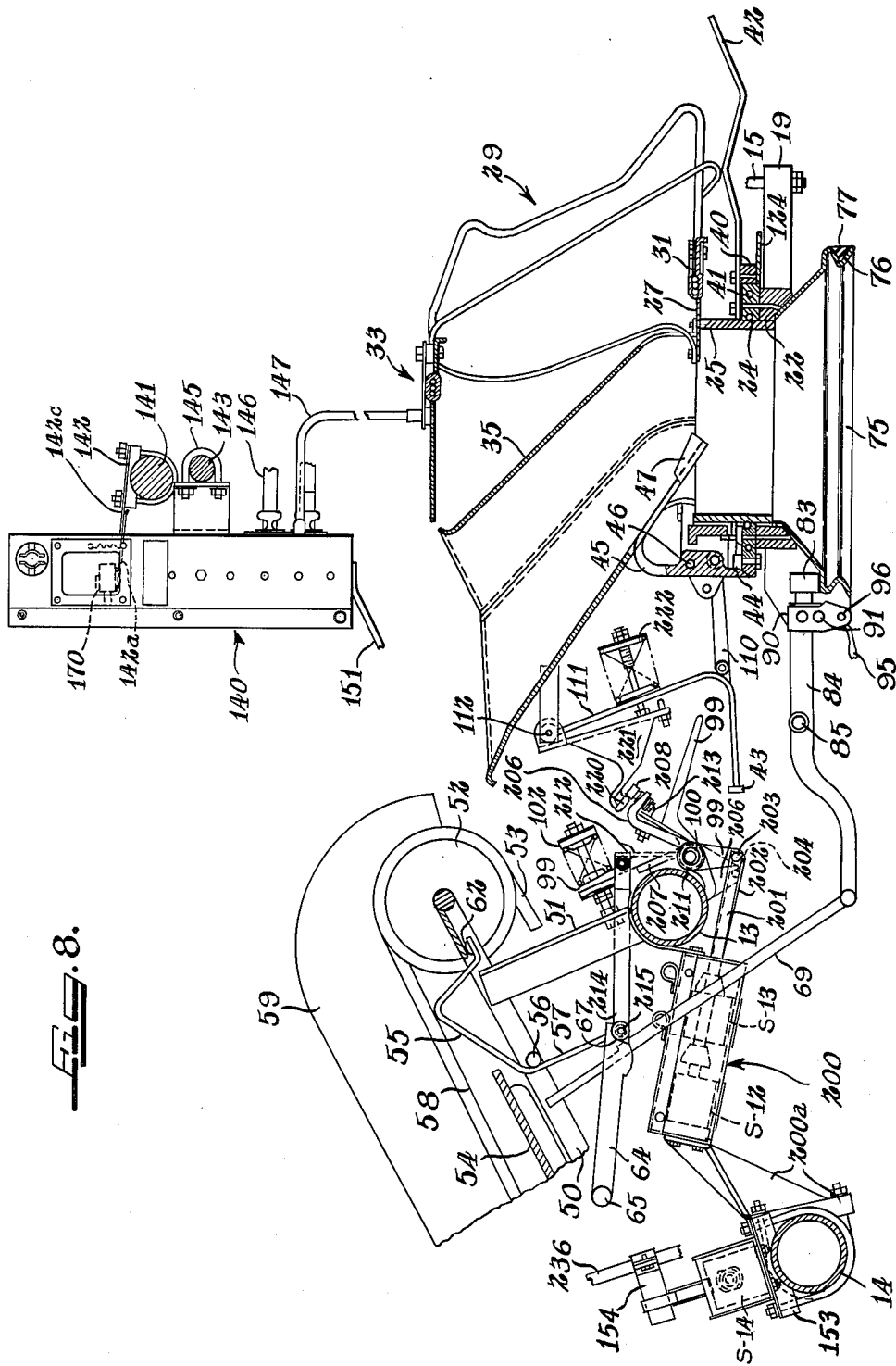

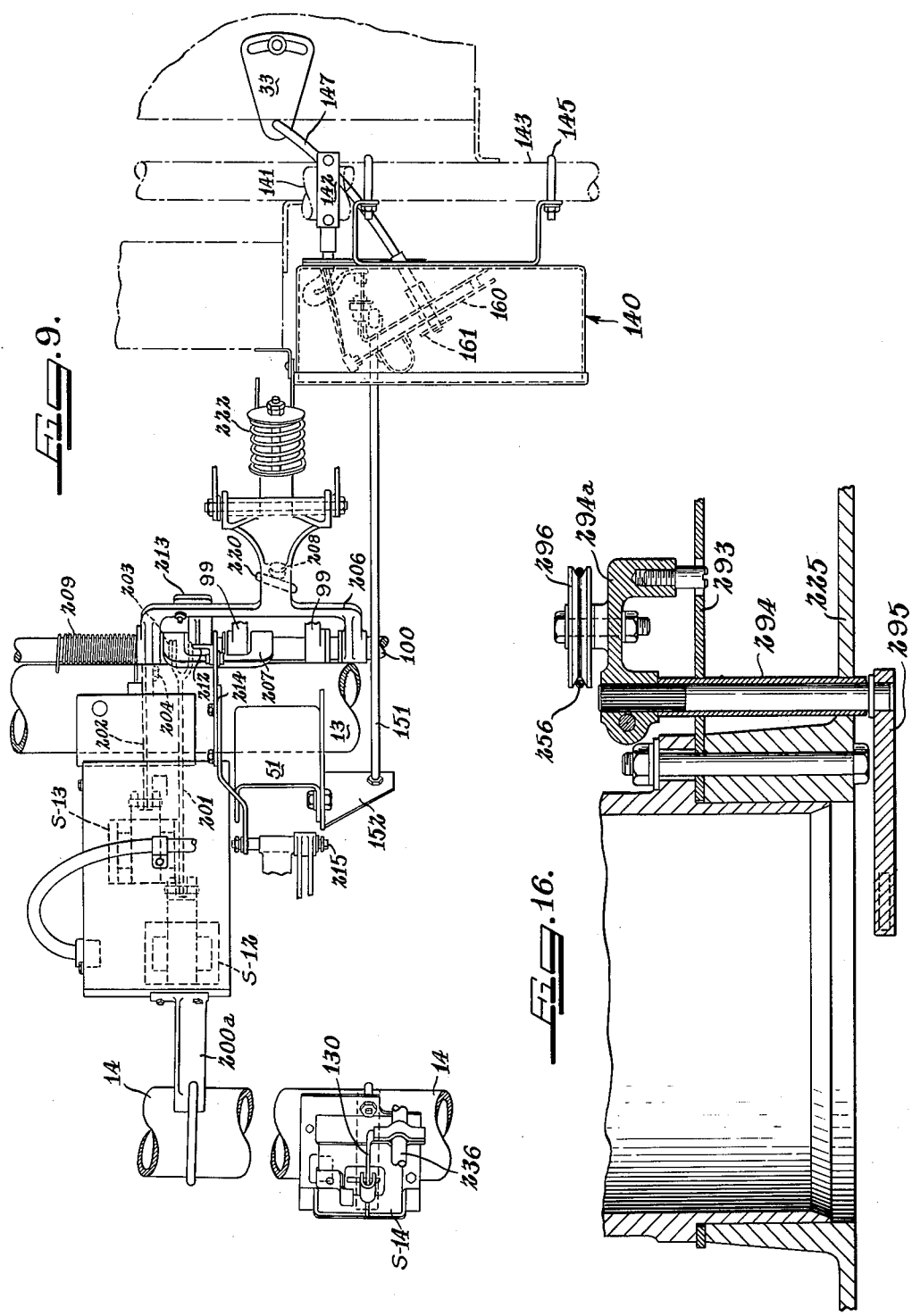

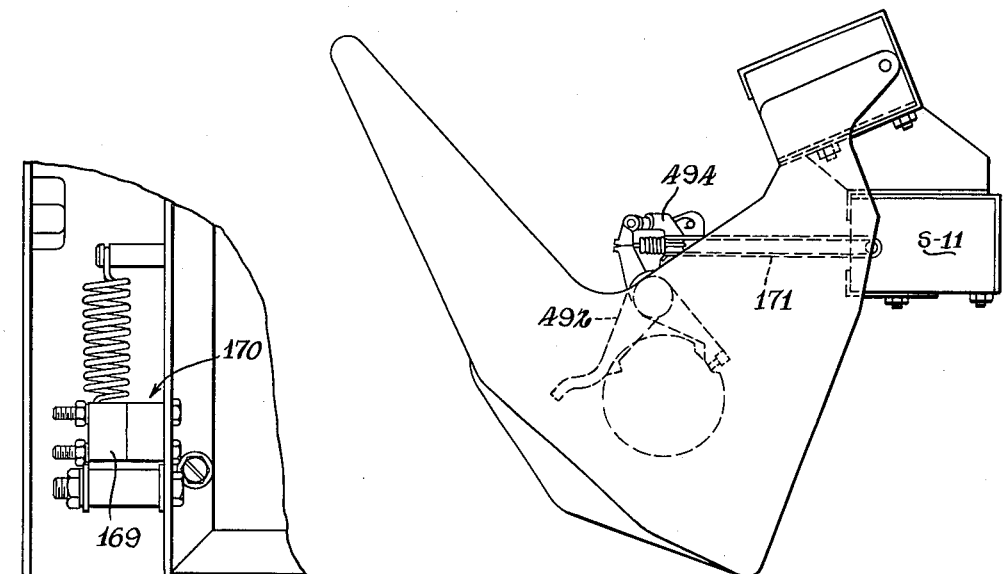
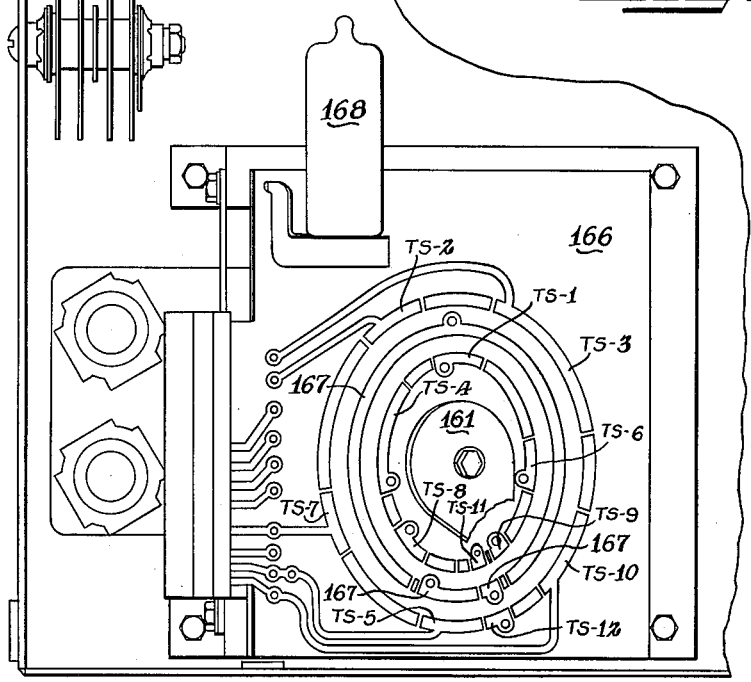
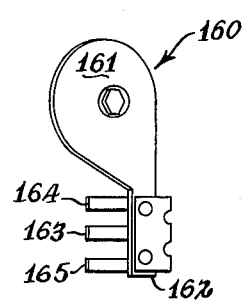

Nov. 23, 1965 A. P. ROGERS 3,219,345
SELECTIVE PINSETTING CONTROL
Filed Sept. 4, 1962 14 Sheets-Sheet 10
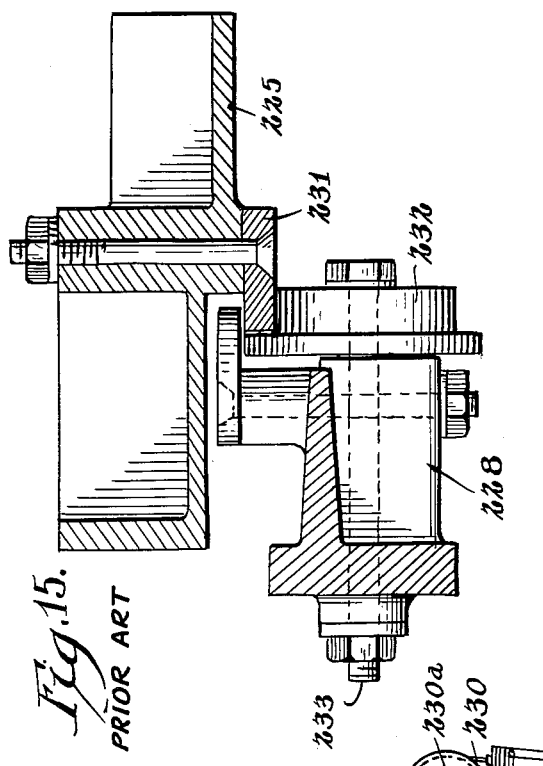
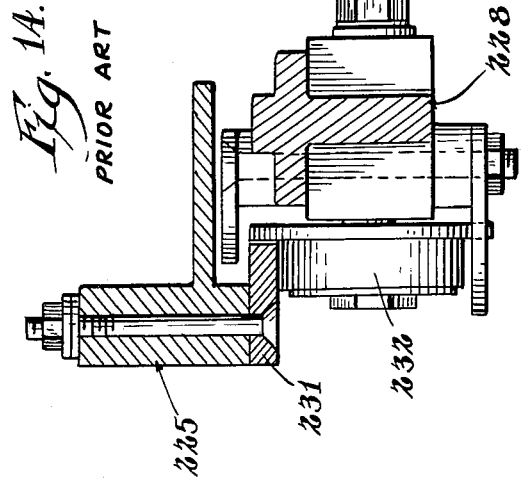
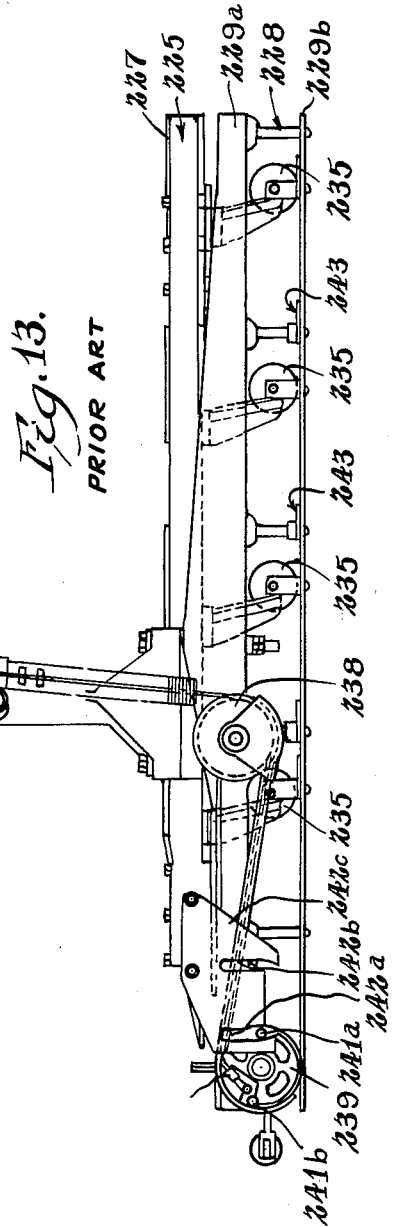

Nov. 23, 1965     A. P. ROGERS     3,219,345
SELECTIVE PINSETTING CONTROL
Filed Sept. 4, 1962     14 Sheets-Sheet 11
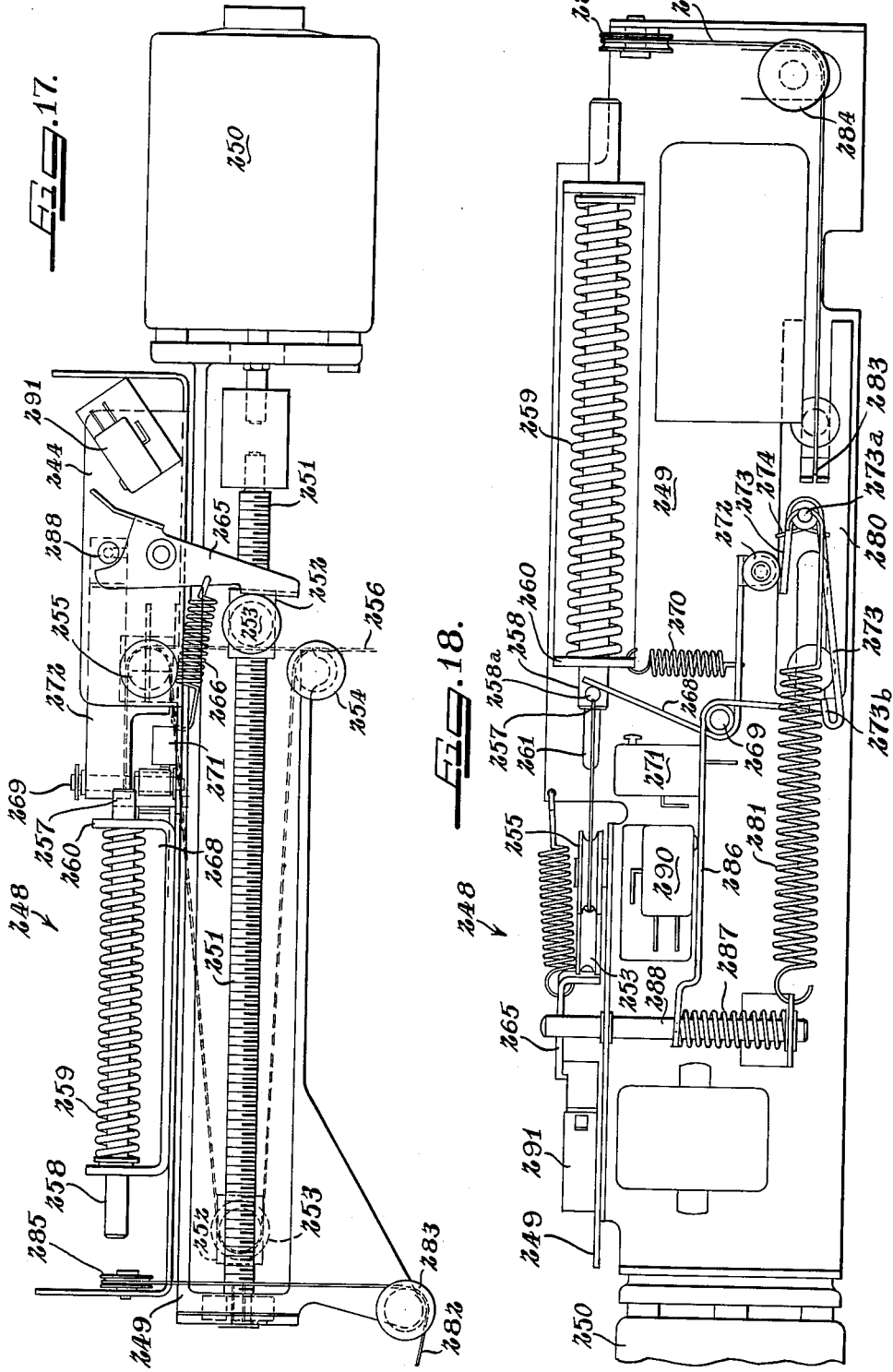

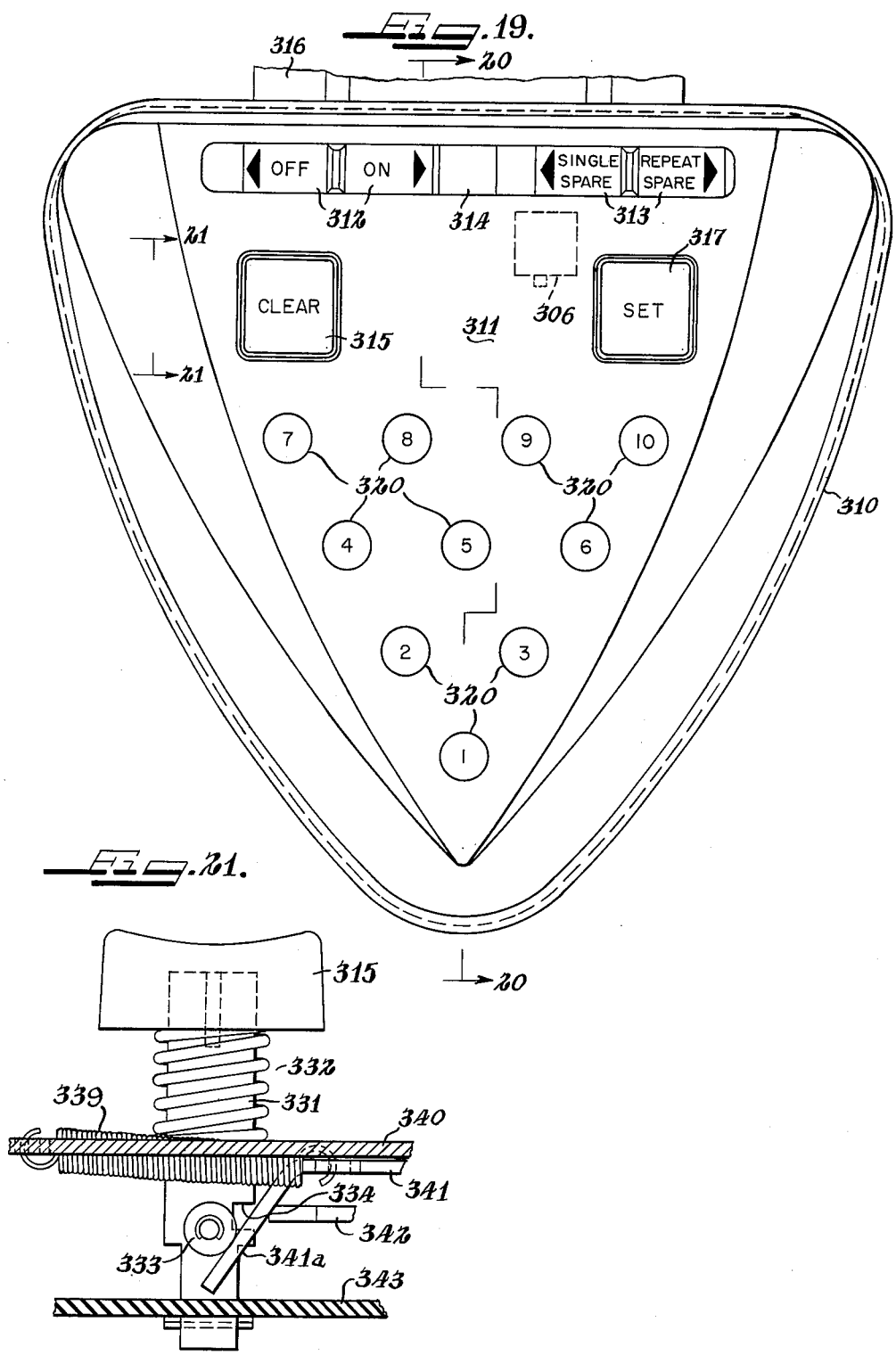

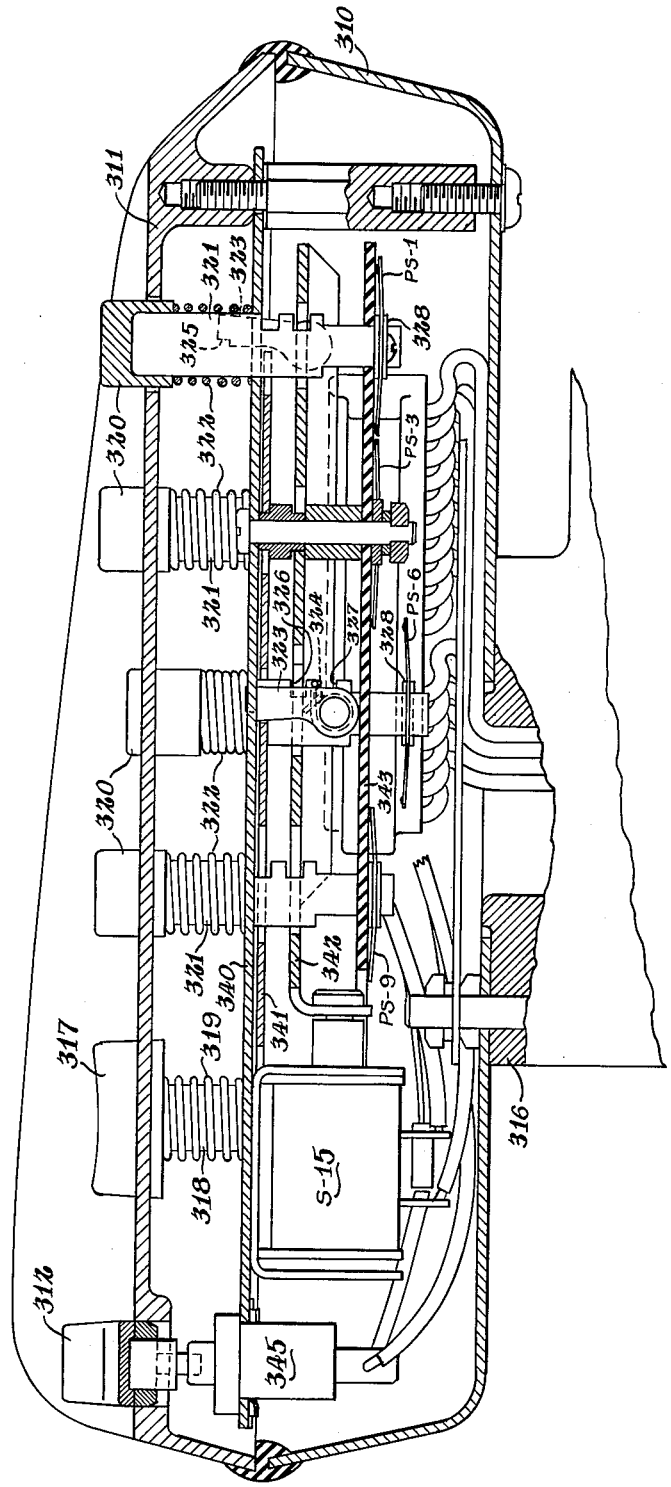

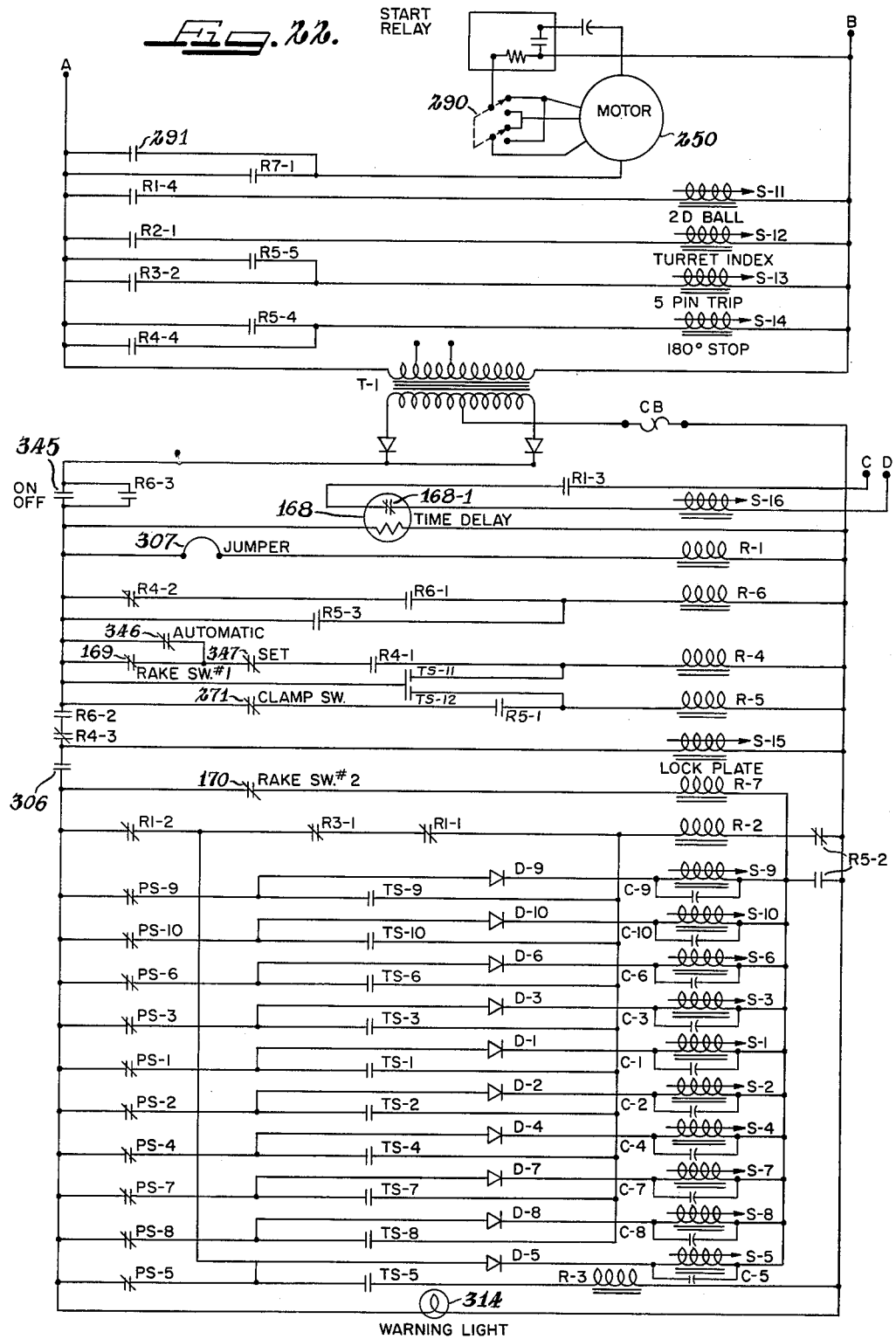

United States Patent Office 3,219,345
Patented Nov. 23, 1965

3,219,345
SELECTIVE PINSETTING CONTROL
Albert P. Rogers, Spring Lake, Mich., assignor to Brunswick Corporation, a corporation of Delaware
Filed Sept. 4, 1962, Ser. No. 221,035
18 Claims. (Cl. 273—43)

This invention relates to bowling pin handling apparatus, and particularly to a pin handling mechanism for use in an automatic pinsetter to enable the selective setting of less than the normal complement of ten pins for practice bowling, for example.

It is a general object of the invention to provide a new and improved pin handling apparatus of the type described.

Another object is to provide a new and improved pin handling apparatus of the type described, including an indexable pin receiving turret for delivering pins to a pin setting deck structure, conveyor means having a discharge end disposed to deliver pins successively to pin receiving pockets in the turret, means for operating the conveyor and the turret in timed relationship to fill the turret pockets, and selectively operable means for controlling the turret and the conveyor means to fill only preselected pockets in the turret less than the total number of turret pockets.

A more specific object is to provide a new and improved apparatus of the type described, including manually selectively operable control switch means corresponding respectively to pin receiving pockets in the turret, for controlling operation of the conveyor means and turret to preselectively prevent delivery of pins to preselected turret pockets.

Still another object is to provide a new and useful apparatus of the type described which is capable of functioning during normal two-ball bowling in setting the normal complement of ten pins but which is also usable for setting preselected combinations of pins for practice bowling purposes, e.g. for one-ball bowling against preselected "spare" combination, wherein the pinsetter can be signalled to automatically reset the same pin combination after each ball or alternatively can be signalled to set a new combination of pins as selected after each ball.

Yet another object is to provide a bowling pin handling apparatus which includes a pin conveyor and delivery means for feeding pins to an indexable pin receiver including a plurality of pin receptacles arranged to move successively past a pin receiving station in such a manner that pins are delivered only to preselected pin receptacles and the indexable receiver is otherwise maintained empty, and in which apparatus there is also included deck means disposed to receive the pins from the preselected receptacles and deliver the pins so received to a bowling alley, especially while maintaining the deck structure otherwise normally full of pins so that the deck structure normally contains a full complement of ten pins to enable more rapid and efficient change in pin selection.

In preferred aspects of this invention, features which may be employed in accordance herewith are motor actuated cable operated single clamp means for preventing setting of non-selected pins by the deck structure, a turret control system including a wiper adapted to track on a plurality of concentric circular arrays of contacts for completion of electrical contact at or during appropriate intervals coordinated with the rotation of the turret to effect control of delivery of pins to the turret, a console device removed from the location of the pinsetter for remote actuation of control means at the pinsetter, an accessible means such as a jumper arrangement on the pinsetter in a disconnect plug of the control console adapted to prevent pin jams if the console is unplugged while the turret is receiving pins, a particular cable control assembly which includes a motor adapted to drive a threaded shaft to cause a nut member to thread longitudinally on the shaft and tighten a cable for holding clamps in the pin deck in a preselected position to permit or prohibit setting of pins from the pin positions as desired wherein the movement of the nut along the shaft and the movement of the pin deck structure during the pin setting operation are effective to automatically hold the proper clamps in proper positions and are also effective to reset the cable control mechanism responsive to conditions at the pin deck for use during a subsequent pin setting cycle.

Other objects and advantages will become readily apparent from the following detailed description taken in connection with the accompanying drawings, in which:

FIGURE 8 is a vertical sectional view, similar to FIGURE 2, illustrating an embodiment of the turret control of the present invention with portions of the turret and conveyor actuating mechanisms to which the control is applied;

FIGURE 9 is a top view of the turret control mechanism shown in FIGURE 8;

FIGURE 10 is a plan view of turret switch contacts with a turret wiper removed showing arrangement of contacts and also illustrating placement of rake switches;

FIGURE 10a is a perspective view of the turret wiper mountable in the assembly of contacts of FIGURE 10 to form the turret switch;

FIGURE 11 is a fragmentary elevational view of a pinsetter control mechanism including a solenoid means in the circuit of the present control;

FIGURE 13 is a side elevational view of the pinsetter deck structure of FIGURE 12, with parts removed to more clearly illustrate the construction;

FIGURE 14 is an enlarged, fragmentary vertical section taken generally along the line 14—14 of FIGURE 12;

FIGURE 15 is an enlarged fragmentary vertical section taken generally along the line 15—15 of FIGURE 12 with the clamping assembly removed for clarity;

FIGURE 16 is a vertical section of the clamp at the #3 pin position taken along line 16—16 in FIGURE 12;

FIGURE 17 is a plan view of a drive and control for the clamping mechanism on the deck structure shown in FIGURE 12;

FIGURE 18 is a rear elevation of the clamping mechanism of FIGURE 17;

FIGURE 19 is a plan view of a console panel embodied in the control of the present invention;

FIGURE 20 is a vertical section through the control panel taken generally along line 20—20 in FIGURE 19;

FIGURE 21 is an enlarged side view of the set button as shown in FIGURE 20 but with parts removed to illustrate construction; and FIGURE 22 is a wiring diagram illustrating the control circuit of the present control.

Figure 1:
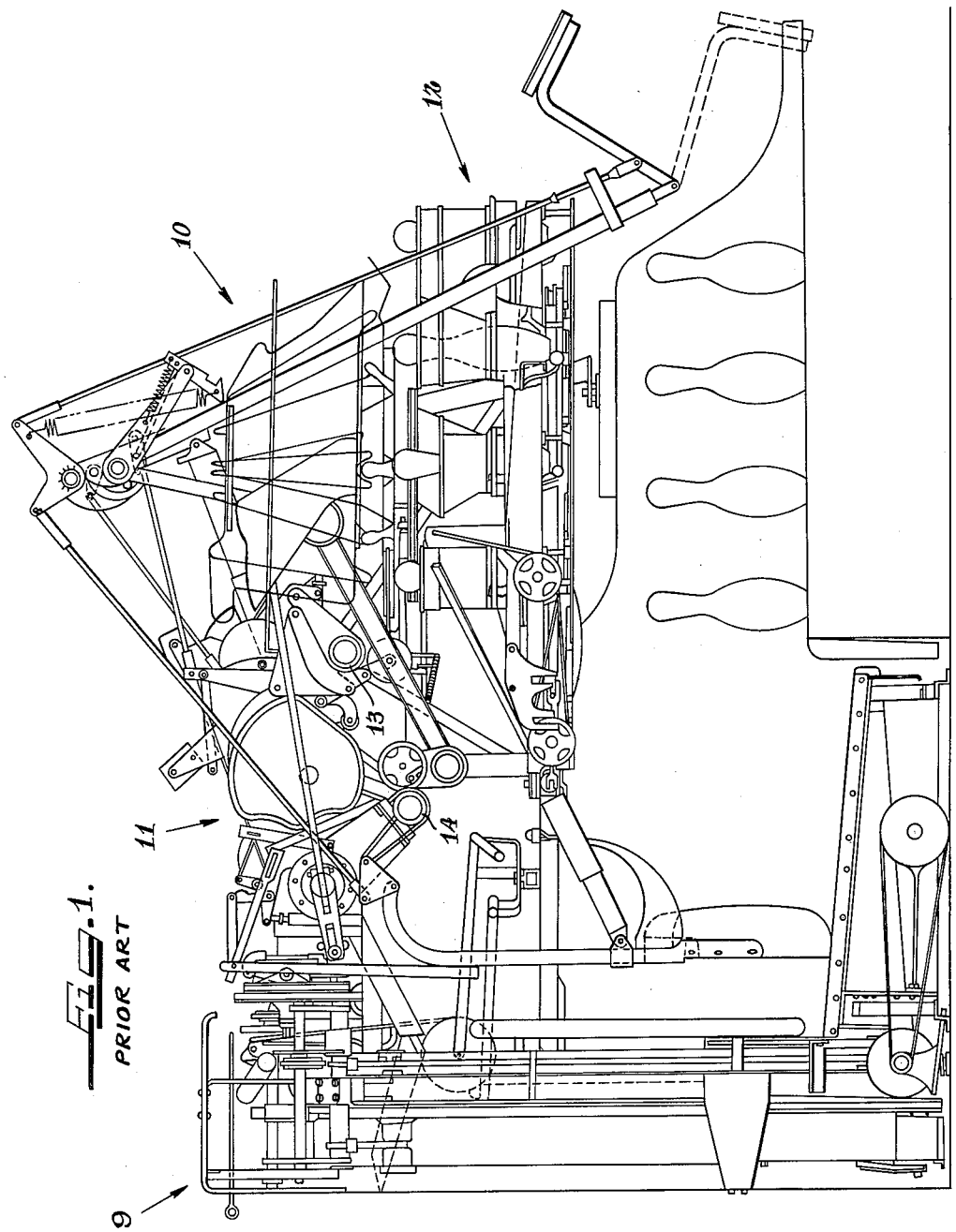
FIGURE 1 is a side elevation of an automatic pinsetter in which there may be incorporated a control embodying the principles of the present invention and a portion of the alley bed with which it cooperates, with parts broken away.

While an illustrative embodiment of the invention is shown in the drawings and will be described in detail herein, the invention is susceptible of embodiment in many different forms and it should be understood that the present disclosure is to be considered as an exemplification of the principles of the present invention and is not intended to limit the invention to the embodiment illustrated. The scope of the invention will be pointed out in the appended claims.

Referring now to the drawings in more detail, the invention is embodied in a pin handling mechanism adapted for use in an automatic pinsetter and including a turret structure generally designated 10 and a conveyor structure generally designated 11 arranged to deliver pins one at a time to the turret structure. As is shown in FIGURE 1, the conveyor is adapted to receive pins from a pin gathering mechanism generally designated 9 for collecting pins in the pit at the end of a bowling alley, elevating the pins to the level of the receiving end of the conveyor and depositing the pins on the conveyor for travel serially with the butts of the pins leading. The turret structure is adapted to deliver as many as a full complement of ten pins to a pinsetting structure generally designated 12 for setting the pins initially in playing position on the alley, lifting standing pins after a first ball is rolled in order to permit removal of dead wood, and resetting such pins in playing position for the second ball. It is not intended that a complete automatic pinsetter is to be described and illustrated herein, but rather that reference should be made to such known pinsetter as that described and illustrated by Huck et al. in U.S. 2,949,300, patented August 16, 1960 as a pinsetter in which the apparatus herein described can conveniently be used.

The operating parts of the conveyor and turret structures may be supported in any suitable manner, and as illustrated herein are supported by means including a rigidly mounted tubular shaft as at 13 (FIGURES 2 and 3), a similar shaft as at 14 and hanger rods as at 15. Opposite ends of the shafts 13 and 14 may be suitably supported on kick-backs, and the hanger rods 15 may depend from a suitable superstructure also mounted on the kick-backs. In the preferred construction illustrated, a suitably shaped chassis or frame member 17 is supported by attachment to cross shaft 13 as at 18 and includes a pair of diverging arms as at 19 supported by the hanger rods 15.

Intermediate opposite ends of the frame member 17, it includes an annular support 22 on which is mounted a bearing member 23 having an inner race 24 rotatably supporting a tubular member 25 forming the hub of the indexable turret. An annular plate 27 is attached to the upper edge of the hub 25 as by screws 28, for supporting wire rods as at 29 providing nine outer pin receiving pockets spaced around the axis of turret rotation. Lower ends of the wire rods are secured to the plate 27 by means of clamps 31 and upper ends of the wire rods are held securely in position relative to each other by means of clamping plates as at 33. As will be understood on reference to FIGURE 2, the pin receiving pockets provided by the wire rod structure 29 are disposed in an annular series concentric around the axis of turret rotation and adapted to receive pins for each of the conventionally numbered pin positions except the #5 pin.

Figure 2:
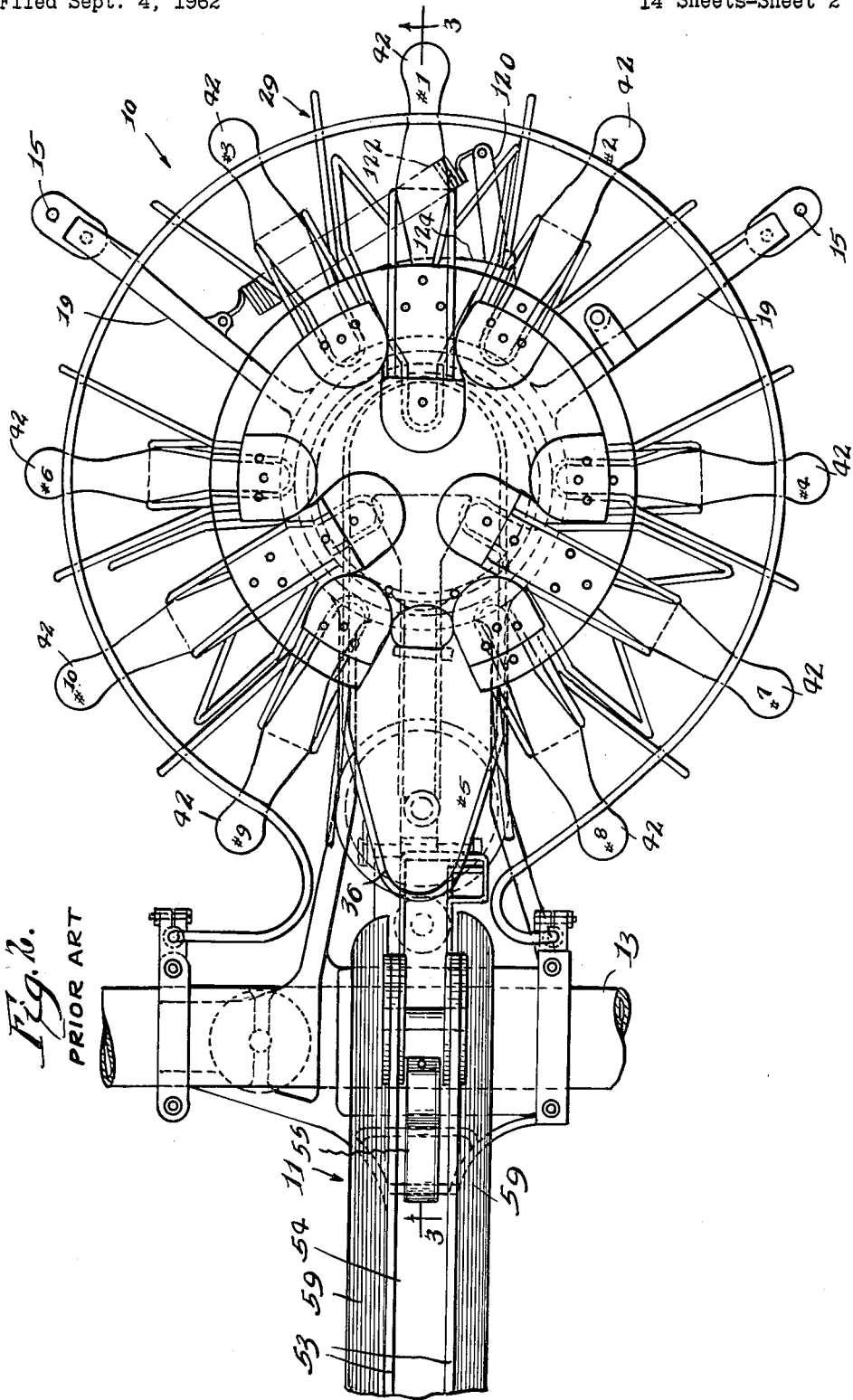
FIGURE 2 is a fragmentary plan view of a pin handling apparatus including cross conveyor and turret forming part of the pinsetter of FIGURE 1.
Figure 3:
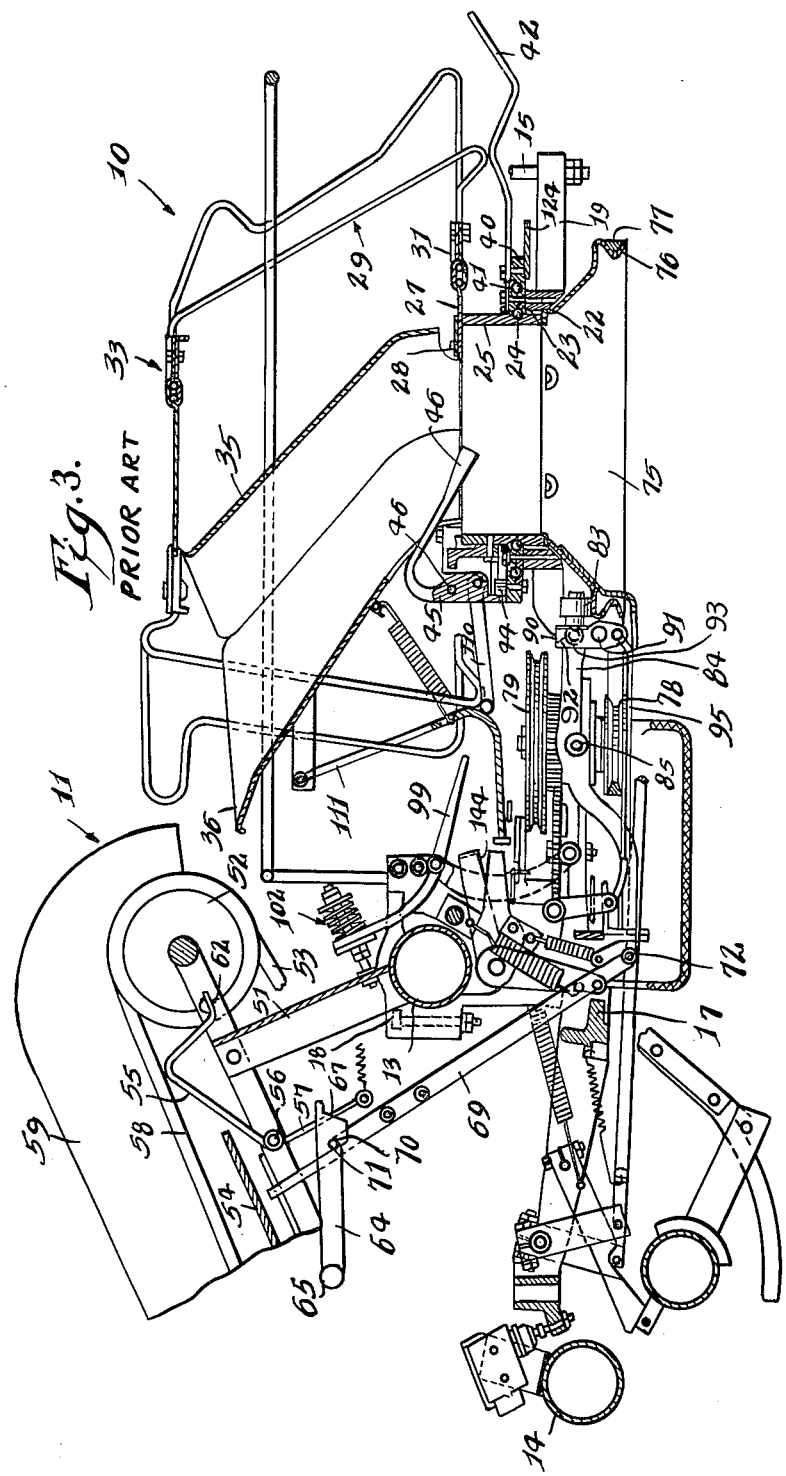
FIGURE 3 is a vertical sectional view taken at about line 3—3 of FIGURE 2.

The turret includes a chute 35 for receiving the #5 pin. The lower end of such chute is positioned centrally of the turret and secured to the upper end of the hub member 25. The upper portion of the chute is inclined upwardly and toward the left, when the turret is positioned angularly as illustrated in FIGURES 2 and 3, and terminates at the upper end in a mouth or opening 36 for receiving the #5 pin.

The pin receiving pockets provided as described above are positioned on the indexable turret structure to move successively through a pin receiving station immediately beneath the discharge end of the conveyor structure 11 as the turret is indexed. In operation, the turret is indexed to position one of the receiving pockets at the pin receiving station, whereupon the conveyor delivers a pin to such pocket, after which the turret is again indexed to position the succeeding pocket at the pin receiving station. According to conventional procedure, these steps are repeated until such time as the turret is completely filled with a complement of ten pins.

Figure 5:
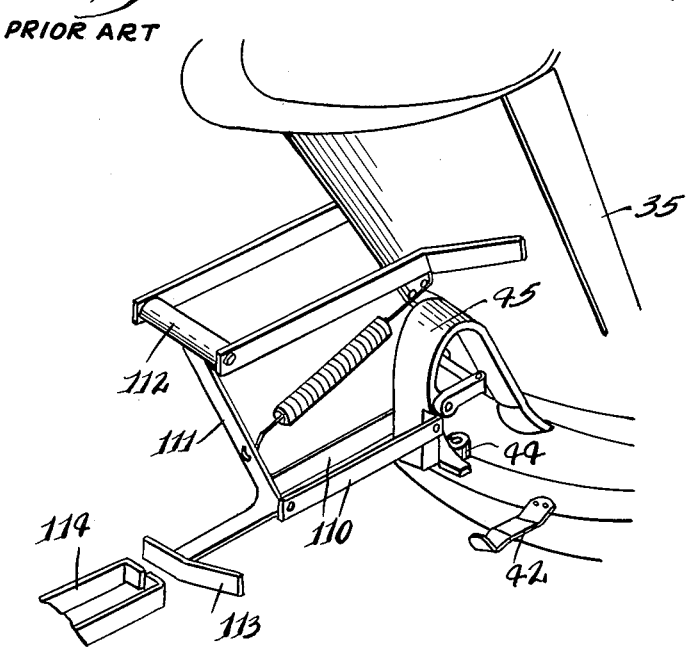
FIGURE 5 is a perspective, somewhat diagrammatic view, taken from the left front of FIGURE 3, illustrating a latch and trip mechanism controlled by the passage of the last pin to the turret in conventional cycling of the apparatus.
Figure 6:
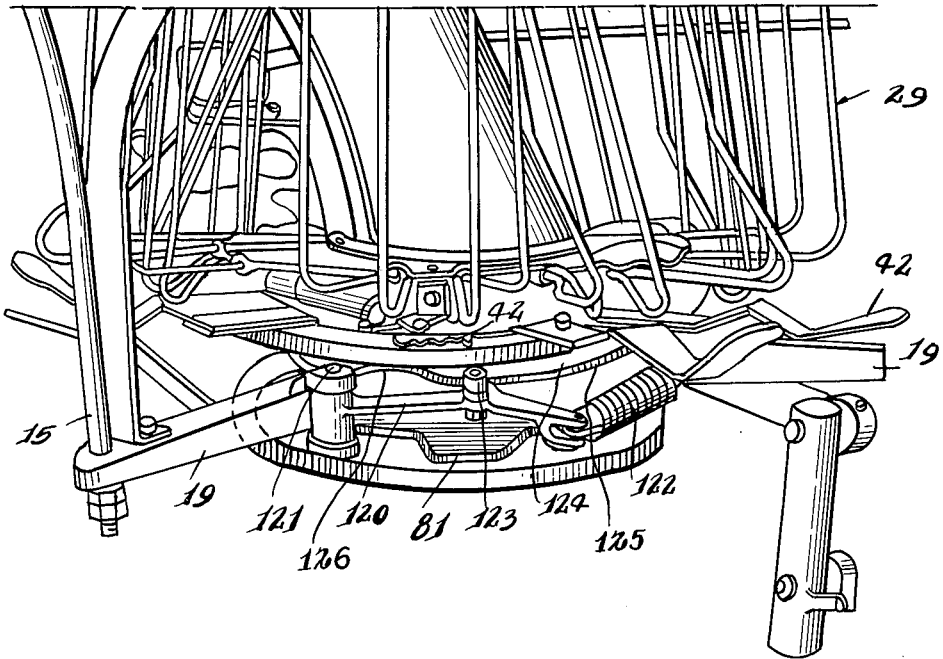
FIGURE 6 is a fragmentary perspective view taken from the front of FIGURE 2, illustrating a control for the pin supporting means in the turret.

In order to support the pins in the nine outer pin receiving pockets, a spider structure (see also FIGURE 6) is provided including an annular hub 40 rotatably mounted by means of an outer race 41 on the bearing 23. The hub 41 has nine outwardly projecting fingers or spoons 42 disposed respectively beneath the chutes or guides provided by the wire rods 29 to thereby form the bottoms of the pin receiving pockets. The spoons 42 thus support the pins in the nine outer pockets. While the spider is rotatably mounted for movement relative to the turret hub 25, it is normally latched to the hub 25 for rotation therewith as the turret is indexed. To this end, the spider hub 40 includes a latch roller 44 (FIGURES 3 and 5) adapted for engagement by a latch 45 pivotally mounted on the turret hub 25 as at 46. The latch member 45 carries a trip arm 47 projecting into the chute 35 and engageable by the tenth pin in the series delivered to the turret, for the #5 pin position, to pivot the latch to release the spider for rotation relative to the turret to thereby remove the pin support provided by the spoons 42 in order to release the pins to drop to the deck structure below the turret, as will be explained in more detail presently.

The conveyor means 11 includes a frame 50 preferably supported by a bracket 51 attached to the cross shaft 13 and the frame 50. The frame provides a support for a pair of parallel belt pulleys as at 52, on a common axis, and having a pair of belts 53 trained thereabout. Opposite ends of the belts 53 pass around drive pulleys adapted to be continuously driven, so that the belts 53 are continuously driven. The belts are spaced apart by a distance somewhat less than the diameter of a bowling pin at the belly of the pin, so that the large portion of the pin is adapted to rest on the belts, with the base leading, and with the head of the pin falling between the belts and resting on a plate as at 54. The upper reaches of the belts 53 are supported on and travel along edges as at 58 provided on side plates 59 suitably attached to the conveyor frame. The pins are delivered to the belts 53 by the pin elevator mechanism 9 (FIGURE 1) which gathers the pins in the pit of the alley and delivers them to the belt one at a time, for delivery to the turret structure in similar fashion, so that the pins fall base first into the pockets on the turret.

In order to control the delivery of pins from the cross conveyor to the turret, so that pins are delivered only one at a time to the turret and may be spaced in time so as to fall only into empty pin receiving pockets on the turret, a pin gate is provided at 55, pivotally mounted on the frame 50 as at 56 and including a lower arm 57 adapted to control the movement of the pin gate by virtue of an interlock with the turret operation, as will be explained presently.

In operation, the pin gate 55 is normally urged in a counter-clockwise direction by a return spring 61 secured to the end of the lower arm 57 and suitably anchored on the frame, so that an end portion 62 of the pin gate arm 55 abuts against the frame 50. The pin gate is normally latched in the position described by means of a pin gate latch 64 suitably pivoted on the framework as at 65 and biased in a clockwise direction by means of a spring 66. The latch 64 includes a recessed end portion as at 67 adapted to receive the lower end of the pin gate arm 57, preventing clockwise movement of the pin gate member. With the pin gate latched as described, a pin travelling along the continuously driven belts 53 will be stopped upon engagement with the pin gate arm 55. However, after the turret has indexed to position an empty pin receiving pocket at the pin receiving station beneath the discharge end of the conveyor, the pin gate latch 64 is released to allow clockwise movement of the pin gate under the urge of the pin engaged therewith, so that the pin is permitted to pass to the turret.

The latch 64 is normally held in a latching position by means of a latch spring 66 and is adapted to be released by a latch link 69 having a notch 70 adjacent the upper end thereof engageable with a pin 71 on the latch. The lower end of the link 69 is attached to a movable pivot as at 72, and the link is urged in a clockwise direction by spring 73 suitably anchored on the framework. After the turret is properly indexed to receive a pin from the cross conveyor, the link 69 is moved upwardly to engage pin 71 to thereby pivot the latch in a counter-clockwise direction, releasing the lower pin gate arm 57 to permit pivotal movement of the pin gate in a clockwise direction and thereby facilitate passage of a pin along the conveyor.

In order to drive the turret through its indexing steps as it receives a complement of pins, the turret hub 25 is provided with a depending bell-shaped extension 75 formed at the lower end to provide a pulley 76 for receiving a belt 77 trained thereabout and trained about a drive pulley 78. The pulley 78 is interconnected with a driving pulley 79 adapted to be continuously driven by means not illustrated, so that the lower pulley 78 is continuously driven. So long as the turret is free to rotate, the drive described including the belt 77 is effective to turn the turret. However, when the turret is held against rotation, as when stopped to receive a pin, the pulley 78 slips relative to the belt 77.

Indexing movement of the turret under the continuous urge of the driving belt 77 is controlled by means of an indexing cam preferably formed on or attached to the bell-shaped extension 75 and provided with a series of upwardly facing recesses as at 81 (FIGURES 4 and 6) angularly spaced about the axis of the turret at positions corresponding to the positions of the pin receiving pockets. The recesses 81 receive a stop roller 83 carried on the end of a stop lever 84 pivotally mounted on the frame as at 85 and interconnected with the pin gate latch release link 69 as at 72. While the stop roller 83 is held in one of the stop recesses 81, rotation of the turret is prevented, but when the stop lever and the stop roller are free to rise, the tendency of the turret to turn forces the stop roller upwardly, allowing turret rotation.

Figure 4:
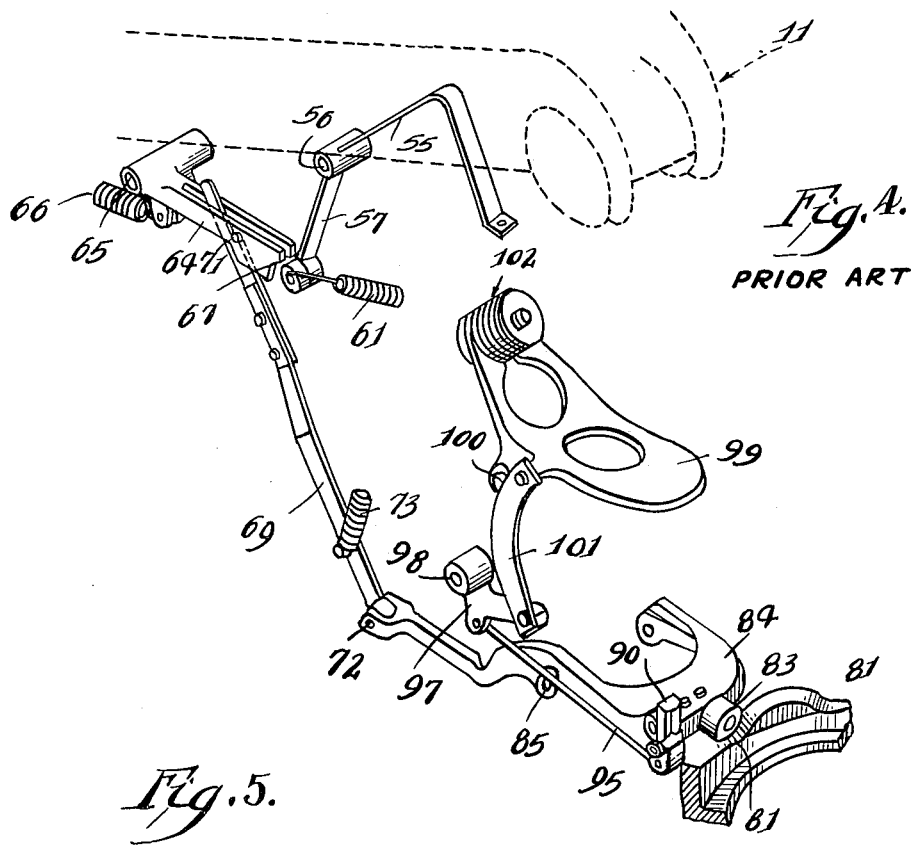
FIGURE 4 is a perspective, somewhat diagrammatic view, taken from the right front of FIGURE 3 illustrating a latch and trip mechanism for controlling turret indexing and for controlling the passage of pins from the conveyor to the turret.

The stop lever 84 and the stop roller 83 are normally held in the depressed position illustrated in FIGURES 3, 4 and 8 by a latch 90 pivoted at 91 and carrying a latch lug 92 engageable over a latch roller 93 on the stop lever 84. The latch 90 is normally maintained in the latching position illustrated, but may be pivoted in a clockwise direction by means of a latch release mechanism including a latch release link 95 having one end connected to the latch as at 96 and the opposite end connected to a lever 97 pivoted on the frame as at 98. The lever 97 includes an arm connected to a trip mechanism including a trip lever 99 pivoted on the frame as at 100 and connected by a link 101 to the lever 97. A spring mechanism 102 mounted on the bracket 51 urges the trip lever in a counter-clockwise direction, elevating the link 101, maintaining the lever 97 in an upper position and thereby maintaining the latch 90 in latching position.

The trip lever 99 is disposed to be engaged by each pin passing from the cross conveyor to the nine outwardly disposed pin receiving pockets on the turret. In this fashion, each pin delivered to one of the nine outer pockets on the turret pivots the trip lever downwardly in a clockwise direction, thereby pivoting the lever 97 also in a clockwise direction to retract the latch release link 95 and pivot the latch 90 in a clockwise direction to release the stop lever 85 to permit the turret to index to position the next pin receiving pocket at the pin receiving station.

As the turret indexes, the stop roller 83 is free to drop into the succeeding depression 81 it encounters and the latch is free to return to latching position so that the turret is stopped with the next pin receiving pocket positioned at the pin receiving station.

Operation of the pin gate 55 on the cross conveyor is interlocked with operation of the turret by virtue of the connection at 72 of the pin gate latch release link 69 with the stop lever 84. As best illustrated in FIGURE 4, when the stop lever 84 is pivoted in a counter-clockwise direction as the stop roller rides up onto a high part of the indexing cam, the pin gate latch release link 69 is pulled downwardly. As turret indexing continues, and the stop roller 83 rides down into another depression 81 on the indexing cam, the stop lever 84 pivots in a clockwise direction, forcing the pin gate latch release link 69 upwardly. This occurs at about the time that turret indexing is complete. As the link 69 moves upwardly, the notch 70 provided adjacent the upper end thereof engages the pin 71 provided on the pin gate latch 64, thereby to pivot the latch 64 upwardly, releasing the lower arm 57 of the pin gate so that a pin encountering the pin gate arm 55 is effective to pivot the pin gate, allowing passage of the pin to the turret. After the pin passes, the return spring 61 returns the pin gate to a pin blocking position where it is held by the latch 64.

It should be noted that the latch 64 is released from the release link 69 when the lower arm of the pin gate is pivoted in a clockwise direction as a pin passes over the pin gate, as the lower arm of the pin gate engages the latch release link 69 to pivot it in a counter-clockwise direction, disengaging the notch 70 thereon from the pin 71 on the latch 64. This allows the latch to fall to a latching position when the pin gate is spring returned to blocking position after the passage of a pin.

Turret indexing and pin travel on the cross conveyor are controlled in the fashion described above while pins are deposited in the nine outer pin receiving pockets on the turret. These pockets, as illustrated in FIGURE 2, are for the #9, #10, #6, #3, #1, #2, #4, #7 and #8 pin positions, and pins are delivered to the turret pockets in the order mentioned.

When the chute 35 is indexed to the pin receiving station, to receive a pin for the #5 position, the trip member 99 is not engaged by this pin, and other means are provided to effect indexing of the turret and operation of the pin gate 55. Such other means includes the trip lever portion 47 projecting into the pin chute 35 and engageable by the tenth pin as it enters the chute. The latch and trip member 45 when engaged by a pin in the chute 35 initiates a series of operations which results in dropping the ten pins to the deck structure below after rotation of the spider relative to the turret pockets, followed by an indexing of the turret relative to the spider to reposition the parts for supporting pins, and actuation of the pin gate to permit the passage of the first pin in the next complement.

The latch and trip member 45 is controlled by a mechanism including links 110 (FIGURE 5) each having one end pivoted on the member 45 and the opposite end pivotally connected to a lever 111 pivoted as at 112 on the chute 35 and having a probe 113 engageable with a control member 114. The member 114 is provided for the purpose of preventing indexing of the spider relative to the turret to drop the pins in the event that the deck structure situated therebeneath is not suitably prepared for receiving the complement of pins from the turret. In the event that the deck structure is prepared to receive the pins from the turret, the control member is withdrawn from the position illustrated by means (not shown) so that the probe 113 and the latch member 45 are free to move when engaged by a pin in the chute 35.

As previously described, pivotal movement of member 45 when engaged by a pin in the chute 35, releases the latching portion of the member 45 from the turret-spider latch roller 44, the member 45 being carried on the turret, and the roller 44 being carried on the spider. This releases the spider from the turret for movement relative to the turret by a drive means which includes a lever 120 (FIGURE 6) pivoted on one frame arm 19 as at 121 and having a free end connected with a tension spring 122 having its opposite end suitably anchored on the other frame arm 19 (see FIGURE 6). The arm 120 carries a cam follower roller 123 engageable with the periphery of a cam 124 carried by the spider. The cam 124 is provided with a gradually rising peripheral cam surface 125 and at the end of such gradually rising surface a notch or recessed portion 126.

As the turret is indexed while the nine outer pockets are being filled with pins, the gradually rising surface on the cam 124 tensions the spring 122 by forcing the cam roller 123 and the lever 120 in a clockwise direction about the pivot 121. After the ninth pin is delivered to the final outer pin receiving pocket on the turret, and the turret indexes, the cam 124 is positioned so that the follower roller 123 is just entering the recessed portion 126 of the cam. Following this, when the tenth pin is dropped, tripping the latch 45 and releasing the spider from the turret, the tension in the spring 122 forces the roller into the depression 126, causing rotation of the spider relative to the turret to remove the support from the pins in the outer pin receiving pockets on the turret. All ten pins therefore drop to the deck structure below.

Figure 7:
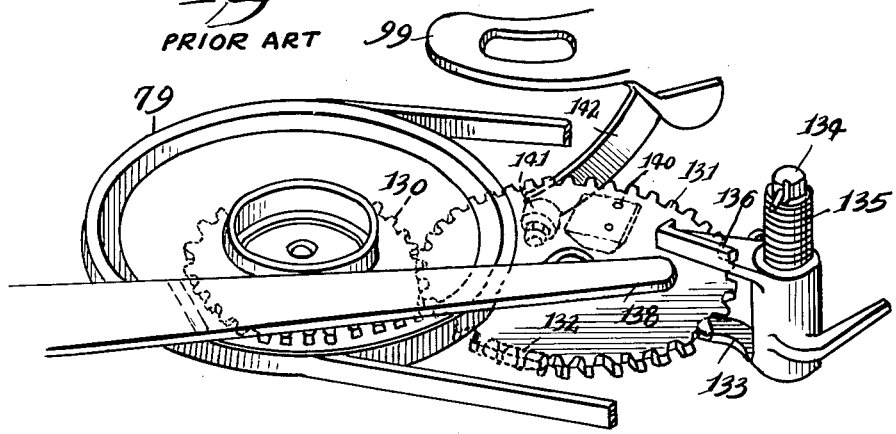
FIGURE 7 is a fragmentary, somewhat diagrammatic view taken from the rear of FIGURES 2 and 3, illustrating a mechanism controlling turret indexing after delivery of the last pin to the turret in conventional cycling.

In order to again position the turret in registry with the pin supporting spider arms or spoons 42, the turret is indexed relative to the spider after all ten pins have been dropped. This is effective by means best illustrated in FIGURE 7 including a gear 130 positioned beneath the turret drive pulley 79 and frictionally engaged therewith to turn therewith when free to do so but also adapted to be held against rotation. The gear 130 meshes with a gear 131 carrying a block 132 engaged by a latch 133 pivoted on the frame as at 134 and urged in a counter-clockwise direction by a torsion spring 135. The gear latch is normally maintained in a position engaging the block 132 to prevent rotation of the gears 130 and 131. It carries an arm 136 engageable by a trip arm 138 carried on the spider, so that when the spider is indexed relative to the turret, the arm 138 engages the arm 136 to release the latch 133, freeing the gears 130 and 131 for rotation.

Also carried on the gear 131 is a cam block 140 engageable with a roller 141 on an arm 142 depending from the trip member 99 normally engaged by the pins passing to the nine outer pin receiving pockets of the turret. When the cam block 140 engages the roller 141, the indexing trip lever 99 is pivoted to release the turret stop latch member 90, freeing the turret for indexing movement. During the indexing, the pin gate 55 is released in the manner previously described. Also during turret indexing, the spider is held against movement by virtue of the engagement of the cam roller 123 with the bottom of the recessed portion 126 on the spider cam 124. After the turret indexing is complete, the turret-spider latch roller 44 is again positioned for engagement with the latch 45 to thereby latch the turret and spider for movement together.

The mechanism as described above and as illustrated in FIGURES 1–7 is conventional in the sense that it has been used commercially. According to the present invention a control is imposed on the mechanism described above for the purpose of preselectively designating only one or more pin positions less than ten at which it is desired that pins be set. Such a control enables the setting of a selected pin or a group of selected pins, rather than the entire complement of ten pins, for example, for the purpose of enabling a bowler to practice shots at selected pins.

Referring now to FIGURE 8, a pin gate and turret control solenoid assembly is provided as generally shown at 200 mounted by bracket 200a to frame member 14. The solenoid assembly has motor means in the form of two solenoids S–12 and S–13 secured therein, each of which may be a 230 volt A.C. solenoid. Solenoid S–12 is provided for causing the pin receiving turret to index any or all of the nine outer pin receiving pockets past the pin receiving station while at the same time preventing delivery of pins from the cross conveyor to the selected pocket or pockets which are not to receive pins. Thus, solenoid S–12, when energized, indexes the turret in the same manner as a pin dropping on the turret indexing lever 99 would index the turret. Solenoid S–13 is provided for causing the turret to index the chute 35 past the #5 pin receiving station while preventing delivery of a pin from the cross conveyor when the #5 pin has not been selected. Additionally, solenoid S–13 trips the turret-spider latch to drop pins from the turret to the deck when the #5 pin has not been selected.

Solenoid S–12 slidably operates link 201 which is pivotally connected to lever 206 as shown at 204. Lever 99 is pivotable by link 201 about its mounting on the frame, as at 100. Referring particularly to FIGURE 4, it will be recalled that clockwise movement of the trip member 99 in this fashion is effective through the latch release link 95 (FIGURE 8) to pivot the latch 90 in a clockwise direction, releasing the stop roller 83 and the stop lever 84 to free the turret for indexing rotation. It will be understood that the solenoid mechanism thus described produces the indexing function normally provided by the dropping of a pin from the cross conveyor onto the trip member 99. The latter is returned to its normal position illustrated in FIGURE 8 by the spring mechanism 102.

Solenoid S–13, slidably operates link 202 which is pivotally connected to lever 206 as shown at 204. Lever 206 is spring urged in a counter-clockwise direction from the position shown by torsion spring 209 and carries cam roller 208 at its other end. The function of cam roller 208 is to ride an inclined cam surface 220 on a member 221 pivoted on the turret assembly, upon rotation of the turret to bring cam 220 into contact with roller 208. The upward urging of cam 220 and member 221 causes lever 111 to pivot about its mounting at 112 to the left as viewed in FIGURE 8, lever 111 and member 221 being yieldably connected by spring 222. Pivoting of lever 111 causes pivoting of trip member 47 in a clockwise direction as viewed in FIGURE 8 to simulate pivotal movement normally given to this member upon passage of a pin from the cross conveyor 11 to the chute 35. This action frees the spider for indexing movement relative to the turret so that the pins which are delivered to the turret may be suitably dropped to the deck structure therebelow even though no pin is received by the chute 35. It will be recalled that indexing of the spider in the manner described immediately above initiates a series of operations which results in subsequently indexing the turret relative to the spider to reposition the spider arms in supporting positions and to index the #9 pocket of the turret to the pin receiving station beneath the end of the cross conveyor 11.

As has been stated, solenoids S–12 and S–13 each additionally act to block pin gate 55 and hold the pin gate in closed position to prohibit passage of pins from cross conveyor 11 to the turrent mechanism. Accordingly, sleeve member 211 is pivotally mounted on frame member 100 and carries arms 212 and 213 projecting therefrom. Energization of solenoid S–12 has been described as causing clockwise pivoting of trip member 99. Upon clockwise pivoting, an arm 207 on trip member 99 engages arm 212 upon which a pin gate lock link 214 is mounted. Pin gate lock link 214 is connected pivotally to the pin gate arm 57 as shown at 215 for locking the pin gate 55 in its closed position shown in FIGURE 8 regardless of release by latch member 64.

For locking of the pin gate by solenoid S–13, arm 213 is engageable by an abutment lever 206 which is moved in clockwise direction by the action of solenoid S–13 as already explained. Lever 206 acts by engagement with arm 213 through sleeve 211, arm 212, pin gate lock link 214 and pivotal connection 215 to hold pin gate 55 in raised or closed position regardless of the operation of latch member 64.

Because of the normal timing of pin gate 55 with usual operation of the illustrated embodiment, the pin intended for chute 35 is normally conveyed past the pin gate 55 before chute 35 is completely indexed to receive the pin. For this reason, solenoid S–13 is energized, in a manner to be more fully described hereinbelow, just prior to indexing of the chute to the pin receiving station beneath the end of cross conveyor 11. In this manner, the pin intended for chute 35 is timely stopped on the cross conveyor when the pin is needed in the #5 pin position. Thus, with S–13 energized as the turret rotates to position chute 35 beneath the end of cross conveyor 11, cam 220 contacts roller 208 and rides upwardly on the roller in such manner that upon proper positioning of chute 35 lever 111 is urged to a raised position pivoting trip member 47 in a clockwise position and triggering the same mechanisms as are triggered by dropping a pin through chute 35 for dropping pins delivered to the turret to the deck structure below the turret even though chute 35 receives no pin.

Also shown in FIGURE 8 is solenoid S–14 which may be termed a 180° stop solenoid, a control superimposed on normal pinsetter operation for purposes of providing one of two alternative modes of operation utilizing the control of the present invention. As will appear, the solenoid may be utilized selectively to provide, instead of automatic operation whereby selected pins are repeatedly positioned on the alley, a mode of operation whereby the pattern of selected pins may be frequently changed. Specifically, as will appear, the solenoid is provided to stop the pinsetter, after each ball is rolled, at 180° in its cycle, that is, with the rake mechanism down adjacent the alley in its most rearward position having just swept pins, to remind the bowler that a pin selection should be made and the pinsetter set in operation.

As indicated above, the present apparatus is intended for use with and as part of automatic pinsetters such as that described by Huck et al. in U.S. 2,949,300. As illustrated in FIGURE 8, solenoid S–14 is mounted to a suitable frame member 14 by means of a mounting bracket as indicated generally at 153. The operating or motor arm of solenoid S–14 is secured by bracket 154 to a connecting link 236. The connecting link 236 corresponds to the connecting link 236 of Huck et al., cited above, which acts to control a clutch assembly and the upper deck position to effect the 180° stop. The stopping action and the mechanisms particularly effecting the 180° stop are fully described by the Huck et al. patent and reference is made to that patent for fuller explanation thereof.

Mounted above the turrent is a control box 140 for solenoids S–12 and S–13. Control box 140 is mounted on a supporting bar 151 secured to frame member 51 by means of support bracket 152. The box is also supported by means of brackets 145 on frame member 143. A flexible drive shaft 147 is suitably connected at 33 to the turret for rotation therewith, preferably at about the axis of rotation of the turret. Flexible drive shaft 147 extends into control box 140 and drives wiper 160 counter-clockwise about circular arrays of switch contacts, TS–1 through TS–12, as better illustrated in FIGURE 10. Wiper 160 has been shown removed from the switch contacts for clarity and is illustrated in FIGURE 10a but its association with the arrays of contacts will be apparent.

Wiper 160 (FIGURE 10a) includes a flat driven member 161 having an arm 162 carrying inter-connected electrical wipers or contact members 163, 164 and 165. The three wipers are adapted to wipe the three concentrically circular arrays of contacts on the printed circuit board 166. Wiper 163 is the common wiper which slides over circular contact 167 while wipers 164 and 165 slide over the inner and outer circular arrays of contacts in the order of their positions upon the board 166 to in effect close switches TS–1 through TS–12. The complete circuitry will be apparent with respect to the wiring diagram of FIGURE 22 discussed hereinbelow.

A time delay 168 and first and second rake switches 169 and 170 are also mounted within the control box as shown in FIGURE 10. The function of the time delay will be described below. Rake switch 169 is a normally open switch and rake switch 170 is a normally closed switch. Switches 169 and 170 each include a pivotally mounted switch operating arm 142a spring biased in a counter-clockwise direction to hold switches 169 and 170 in their normal positions. Switch actuator 142c, mounted by bracket 142 to rake shaft 141 for movement therewith, is adapted to pivot operating arm 142a against the biasing of its spring to actuate switches 169 and 170 respectively to closed and open positions (as shown in FIGURE 8) upon counter-clockwise rotation of rake shaft 141 for the purpose of returning the rake to its normal retracted position. Clockwise rotation of rake shaft 141 to sweep the alley results in release of operating arm 142a permitting return of switches 169 and 170 to normal positions. The rake switches are used for control purposes which will be more apparent hereinbelow.

Referring to FIGURE 11, in order to hold a pinsetter of the type illustrated in the previously mentioned Huck et al. Patent 2,949,300 at all times during selective pin bowling in a mode of operation corresponding to that normally following the second ball in conventional bowling, the pinsetter may be provided with a solenoid S–11 connected as by a link 171 to an extension 494 of a latch 492, corresponding respectively to the extension 494 and the latch 492 in the patent mentioned, to move the latch in a clockwise direction from the position illustrated in FIGURE 11 to a position providing second ball operation in the manner set forth in the patent. This assures that during selective pin bowling, after each ball is rolled the selective pin setup is again repeated without the need for the pinsetter to go through cycling normally providing for the rolling of two balls if these are necessary to knock down the pins. As will appear, the solenoid S–11 is connected in the circuit of FIGURE 22.

Turning now to FIGURES 12–15 of the drawings, there is illustrated an automatic pinsetter deck structure of the general type disclosed in U.S. Patent No. 2,949,300 to Huck et al., and reference may be had thereto for additional discussion of the pinsetter construction and operation. The deck structure is substantially horizontally disposed over the end of a bowling alley adjacent its pit for receiving pins from the turret and setting the pins on the bowling alley in preparation for bowling. In normal bowling operation of the deck structure for conventional bowling, after a first ball has been rolled, the deck structure picks up the pins which remain standing to permit removal of dead wood and then resets the last mentioned standing pins for continued bowling and normally after each frame the pinsetter sets new pins on the bowling alley for play of the following frame.

Generally, the deck structure is vertically movable toward and away from the surface of the bowling alley over which it is installed. The pinsetter deck structure includes an upper deck 225 having a generally triangularly shaped upper deck plate 227, and a lower deck structure 228 including a generally triangularly shaped intermediate deck frame or plate 229a and a lower triangular deck plate 229b. As illustrated in FIGURES 14 and 15, upper deck 225 is supported on lower deck 228 for movement longitudinally of the bowling alley by tracks 231 on the upper deck riding on rollers 232 journaled on shafts 233 mounted on the lower deck. Upper deck plate 227 has suitable openings 234 for receiving bowling pins from the turret. Pins delivered to openings 234 are received on suitable rollers 235 mounted on lower deck 228 when upper deck 225 is disposed longitudinally forwardly on lower deck 228 in a pin receiving position. By moving upper deck 225 longitudinally rearwardly on lower deck 228 to a pin setting position (not shown), the upper deck plate openings 234 are generally aligned with and overlie pin passing openings in the lower deck plates 229a and 229b and pins in upper deck openings 234 move off of lower deck rollers 235 and drop through the lower deck openings.

Figure 12:
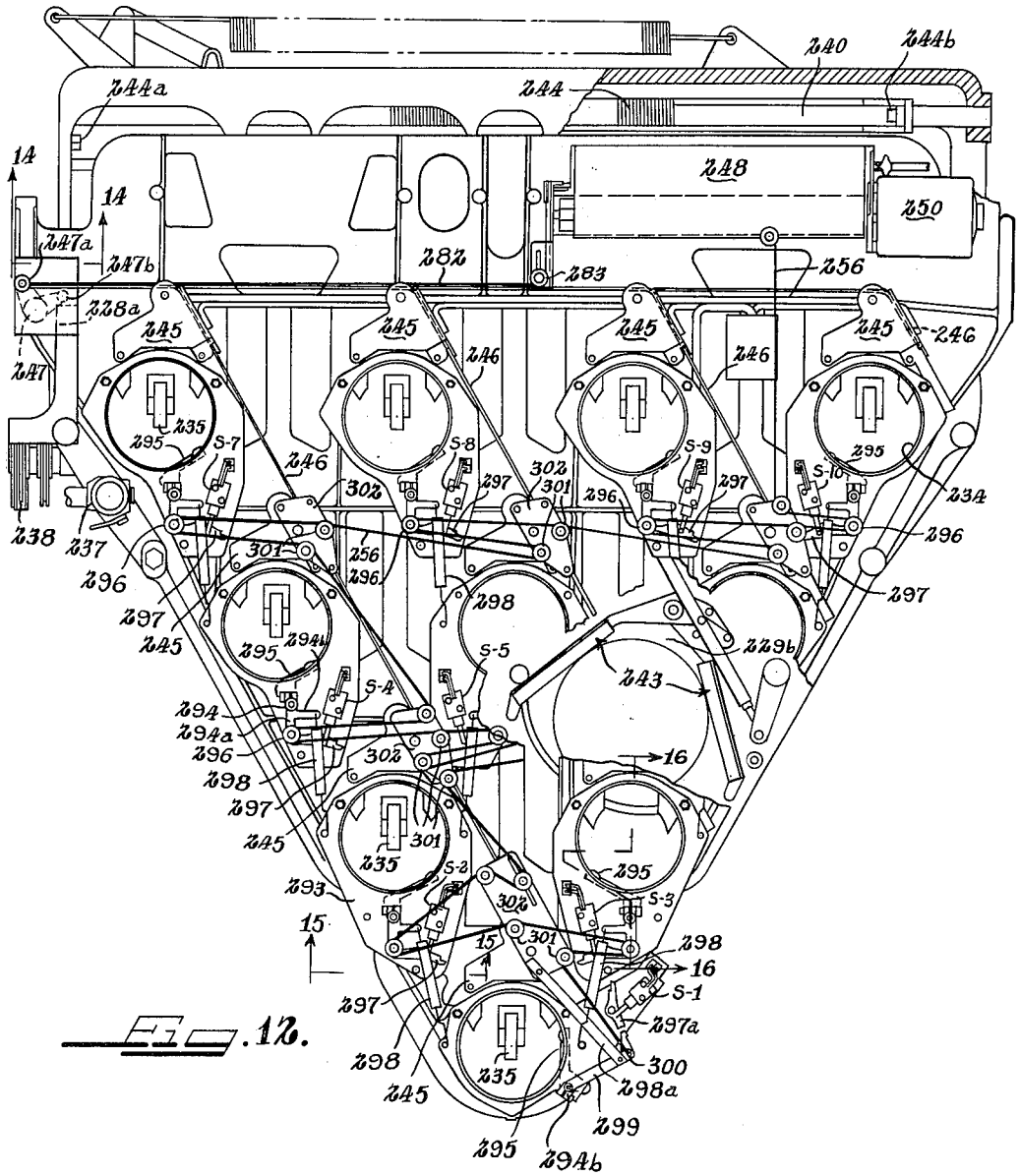
FIGURE 12 is a plan view of the pinsetter deck structure with parts broken away and removed to more clearly illustrate the construction.

Mechanism for moving upper deck 225 across lower deck 228 is fully described in the aforementioned Huck patent, and will be briefly described herein in the form of a cable mechanism. Movement of the upper deck 225 forwardly on lower deck 228, from the pin setting position (not shown) to the pin receiving position illustrated in FIGURES 12 and 13 is accomplished by drawing a cable 230 over a pulley 230a journaled on the upper end of a support 237 which is mounted on lower deck 228. Cable 230 also passes around a pulley 238 journaled on lower deck 228, and passes around and is attached to a pulley 239 secured to the end of a shaft 240 for rotating pulley 239. Shaft 240 extends across the rear of lower deck 228 and is journaled at opposite ends on the lower deck. Secured to pulley wheel 239 are a pair of generally diametrically opposed outwardly extending cam pins 241a and 241b which are movable in cam slots 242a and 242b, respectively, in cam plates 242c secured to and depending from both sides of upper deck 225, for moving the upper deck forwardly and rearwardly on lower deck 228. During movement of the upper deck to the pin receiving position shown in FIGURES 12 and 13, pulley wheel 239 is rotated clockwise as seen in FIGURE 13, winding a spiral torsion spring 244 which is telescoped on shaft 240 and has one end 244a anchored on lower deck 228 and an opposite end 244b attached to a spring anchor secured on shaft 240. When cable 230 is released spring 244 partially unwinds, rotating pulley wheel 239 counter-clockwise and cam pin 241a upwardly in slot 242a rapidly moving the upper deck 225 rearwardly on lower deck 228, whereupon cam pin 241b is engaged in cam slot 242b continuing rapid rearward movement of the upper deck. Actuation of cable 230 is controlled in a suitable manner responsive to a pinsetter operating mechanism as is fully discussed in the previously mentioned Huck patent.

Mechanism is provided for lifting and resetting standing pins on the alley for removal of dead wood after the first ball of each frame during normal bowling. In the illustrated embodiment upper deck 225 is provided on its underside with circular resilient pads or discs (not shown) suitably secured to the underside of upper deck plate 227 and positioned to engage pins standing on the alley when the deck assembly is lowered and in pin detecting position, whether the pins are standing exactly on spot or within a predetermined area surrounding the spot. Engagement of the pads with the tops of standing pins holds the pins securely in position to be gripped at the neck thereof by scissor pick-up mechanism 243, one associated with each opening in the lower deck and mounted on lower deck plate 229b for securely gripping a pin standing within the opening. Suitable scissor pick-up mechanism is more fully discussed in both the aforementioned Huck patent and in Sanford Patent No. 2,817,528.

Also for normal bowling, means for detecting and indicating pins standing on the alley may be provided by apparatus including switch assemblies 245 mounted on upper deck plate 227, and one associated with each opening 234 therein. Each switch assembly is operated in response to a switch actuator detecting the presence of a standing pin on the bowling alley surface to operate a suitable indicator visible to the players, such as a light illuminated in response to operation of the respective switch assembly 245, as is more fully described in copending patent application of Conklin and Torresen, for a "Pin Detecting and Indicating Apparatus," S.N. 126,974, filed July 26, 1961, now Patent 3,118,671, granted January 21, 1964.

In association with switch assemblies 245, four cables indicated by reference numeral 246 extend diagonally across the top of upper deck 225 and each cable operates one or more of switch assemblies 245 to reset the latter. The cables 246 are guided by pulleys mounted for rotation about vertical axes, and each cable has an end suitably secured to a fitting pivotally attached as by a bolt to one arm 247a of a bell crank 247. The bell crank is suitably journaled by a nut and bolt assembly on a housing on upper deck plate 227 for pivotal movement about a vertical axis. During movement of the deck assembly from pin detecting position as shown in FIGURE 12 to pin setting position (not shown) upper deck 225 moves longitudinally of the bowling alley and rearwardly across lower deck 228. A second arm 247b of the bell crank engages an abutment 228a on the lower deck assembly 228 and the bell crank moves clockwise as viewed in FIGURE 12. Such clockwise movement of the bell crank permits limited movement of the cables 246 with respect to upper deck 225 due to springs provided for this purpose as described by Torresen et al. in copending patent application for a "Pin Detecting and Indicating Apparatus," S.N. 133,476, filed August 23, 1961, now patent 3,094,325, granted June 18, 1963. The springs retain cables 246 taut. When the deck assembly again moves from pin setting to pin detecting position, the springs also maintain cables 246 tight and bell crank 247 is rotated counter-clockwise through engagement with abutment 228a to prevent any slack developing in the cables 246.

The deck structure as illustrated in FIGURE 12 is provided with means for clamping nonselected pins with the deck structure during the pin setting operation where it is desired to bowl only at selected pins. Reference is also made to FIGURE 16. Each pin position is provided with a clamp assembly adjacent openings 234 and adapted to pivot a clamp 295 into the opening to hold a bowling pin against being deposited upon the alley during the pin setting phase. The clamps can be activated or de-activated in accordance with a preselected plan.

Each clamp assembly includes a clamp lever 294 (294b in the case of the clamp assembly at the #1 position) pivotally mounted through a mounting plate 293 and the upper deck 225. A clamp 295 is secured to the lower end of each clamp lever and is carried thereby just below the upper deck 225 for pivoting with the clamp lever. In positions #2 through #10, a cable 296 is rotatably mounted on arm 294a of clamp lever 294. The lever arm of clamp lever 294b is indicated at 299 but carries no pulley. Solenoids S-1 through S-10, which are spring return solenoids, are mounted on the mounting plates 293 at the respective pin positions, i.e. S–1 at #1 pin position, S–2 at #2 pin position, etc. Solenoids S–2 through S–10 have their plungers pivotally connected to latch levers 297 and solenoid S–1 has its motor arm pivotally connected to a latch lever 297a. Clamp levers 294 are each urged by a tension spring 298 or a compression spring 298a (#1 position) acting upon clamp lever arms 294b or 299 to bias clamps 295 away from pin clamping position, i.e., away from or out of openings 234. Latch levers 297 engage clamp levers 294 to stop movement of clamps 295 into openings 234, i.e., into pin engaging position.

Cable 256 extends from a cable drive mechanism indicated generally at 248 operatively through a plurality of rotatably mounted cable pulleys, including the aforementioned cable pulleys 296, and its other end is anchored on lever 299 at 300. The additional pulleys other than pulleys 296 are indicated in FIGURE 12 and may be referred to herein as pulleys 301, each of which is mounted for rotation on one of the pulley mounting plates 302. The pulley mounting plates 302 are secured in raised position above the upper deck.

In operation, preselection of a pin position for setting only selected pins, by means to be fully described hereinbelow, results in preventing completion of an electrical circuit to the solenoid controlling the clamp lever latch at the positions selected. During the pin setting phase when the pins are being deposited on the bowling alley, an electrical circuit to only the solenoids at the nonselected positions will be completed just prior to relative movement of the upper and lower decks for depositing the pins on the bowling alley. Thus, the solenoids at the nonselected positions, being energized will pivot the latch levers 297 out of engagement with clamp levers 294 to enable the clamp levers to be pivoted clockwise against the urging of tension springs 208. At the selected positions, latch levers 297 will prevent such clockwise pivoting of the clamp levers. In the case of pin position #1, where the pin position is not selected, solenoid S–1 will be energized and will pivot latch lever 297a in a counter-clockwise direction to permit counter-clockwise movement of lever arm 299 which is otherwise blocked from appreciable counter-clockwise movement by latch lever 297a. Pivoting of lever 299 is against the urging of compression spring 298a. If pin position #1 is a selected position, solenoid S–1 will not be energized and the lever arm will be blocked.

Also prior to shifting of the upper and lower decks for setting of the pins, cable 256 is pulled by cable drive 248 in a manner to be discussed below. It will be noted that cable 256 operatively engages pulleys 296 from one side of clamp lever arms 294a in such manner as to urge the clamp lever arms against the latch levers when the solenoids are de-activated. In those pin positions where the solenoid is activated and the latch lever is pivoted out of engagement with the clamp lever arm, the pulling of cable 256 will, through pulleys 296, pivot the lever arm 294 so as to carry the clamp 295 into engagement with a bowling pin in the opening 234. Such engagement of a pin with the clamp would prevent the bowling pin from passing through opening 234 and from being set on the bowling alley. However, where the solenoid is not energized, due to selection of the pin position, the clamp will not be pivoted to engage the pin and the pin will be permitted to freely pass through the normal pin setting operation to the bowling alley.

In the case of pin position #1, the end of cable 256 is secured to lever 299 and upon pulling cable 256 lever 299 is moved or urged against latch lever 297a where pin position #1 is a selected position and solenoid S–1 is not energized, or will cause pivoting of arm 299 and the clamp 295 into engagement with the pin to prevent setting of the pin where pin position #1 is a nonselected position and the solenoid S–1 is accordingly energized. Referring to FIG. 22 there are shown capacitors C–1 through C–10, one capacitor across the coils of each of the solenoids S–1 thru S–10. These capacitors are used to compensate for the voltage drop caused by the current drain of each of the solenoids.

After the selected pins have been set on the alley, cable 256 is released by the cable drive mechanism 248 and all clamps are returned by tension springs 298 or compression spring 298a to their non-pin engaging positions as shown in FIG. 12. The latch levers also return to their illustrated positions.

In preselected bowling during the setting of the pins from the pin deck, the clamps holding the pins in the non-selected positions are maintained effective by means of a motor driven cable arrangement indicated in FIGURE 12 generally at 248. Referring to FIGURES 17 and 18, there is provided a frame 249 which is supported on the upper deck 225 and upon which is mounted a plurality of associated elements for controlling cable 256 which extends in association with the deck clamp pulleys 296 as described hereinabove. Accordingly, motor 250 is provided and drives a screw rod 251 rotatably mounted on the frame. Motor 250 is a reversible motor which may be controlled by on-off switch 291 and through reversing switch 290.

The apparatus illustrated in FIGURES 17 and 18 can best be described with reference to its operation. Accordingly motor 250 is energized by means of second rake switch 170 as will be more apparent hereinbelow. Motor 250 rotates screw rod 251 to cause nut 252, threaded on screw rod 251, to be driven away from the motor, toward an extended position shown in dotted lines. Nut 252 carries a pulley 253. Clamp cable 256 extends through pulleys 254, 253 and 255 and is anchored at 257 on rod 258 which is biased to the left by spring 259 grounded against frame member 260. As nut 252 progresses away from motor 250, cable 256 is tightened to hold clamps 295 in their selected positions on the upper deck structure. The resulting tension on cable 256 is also applied at 257 to rod 258 to urge rod 258 against the biasing of spring 259. Rod 258 carries a guide pin 258a which guides in slots 261 in frame 249 defining a limit of lengthwise movement of rod 258. As rod 258 is pulled by cable 256, lever 268 which is biased by spring 270 against guide pin 258a is permitted to contact and open normally closed clamp switch 271. Opening clamp switch 271 results in de-energizing and stopping motor 250.

As lever 268 pivots about point 269 under the urging of spring 270, roller 272 which is carried by lever 268 is withdrawn from engagement with lever 273. Lever 273 is pivotally mounted at 273a and is biased by torsion spring 274 in a clockwise direction. Cable 282 extends from slide member 280 through a system of pulleys 283, 284, 285 to crank member 247 (FIGURE 12) and slide member 280 is in effect controlled by crank member 247 through cable 282. Crank member 247, which is a part of the pin detection assembly as described above and as more particularly described in the above mentioned application of Torresen et al., S.N. 133,476, now Patent 3,094,325, pivots and the resulting slack in cable 282 is taken up by sliding of slide member 280 under the biasing of tension spring 281 to permit hook end 273b of lever 273 to slide past an engaging position with lever 286.

The crank member 247 is caused to return to its original position by the upper deck moving forward after deck motion normally used for setting pins.

Upon pivoting of crank member 247 back to its original position, cable 282 pulls slide member 280 back to the position shown in FIGURE 18 against the tension of spring 281. End 273b engages lever 286 and pivots lever 286, mounted pivotally at 269, in a counter-clockwise direction. As lever 286 pivots it disengages switches 290, a pair of switches, one behind the other adapted to reverse the direction of the motor 250. Pivoting of lever 286 also compresses spring 287 and because lever 286 is in engagement with pin 288, pivoting of the lever moves pin 288 away from its blocking position with respect to lever 265. Because nut 252 has progressed away from lever 265 on screw 251, lever 265 is now free to pivot in a clockwise direction under the urging of spring 266. Lever 265 thus engages and closes switch 291 to energize motor 250. Motor 250 rotates screw rod 251 in the opposite direction and nut member 252 is returned to its original position. During return of nut member 252 to its original position, it is apparent that the tension on cable 256 is lessened and rod 258 is permitted to return to its initial position under the urging of spring 259, thereby urging lever 268 from engagement with switch 271 to close switch 271. Roller 272 re-engages lever 273 and pivots end 273b out of engagement with lever 286 and lever 286 is urged by spring 287 toward its original position but is stopped from returning to its original position by engagement of pin 288 with lever 265. Upon return of nut member 252 to its original position, lever 265 is pivoted against the urging of spring 266 out of engagement with switch 291 to de-energize motor 250 and out of engagement with pin 288 to permit pin 288 to return to its original position thereby permitting lever 286 to re-engage switch 290. De-energization of motor 250 by switch 291 is accomplished regardless of the closed position of the second rake switch as will be apparent from discussion of the wiring diagram in FIGURE 22 hereinbelow. Thus, the apparatus is reset for use during the next cycle.

The control panel or console is illustrated in FIGURES 19 through 21. Reference is also made to the wiring diagram of FIGURE 22. Turning now to those figures, the console includes a housing 310 mounted on suitable framework as indicated at 316. Housing 310 includes a top panel member 311 which has a decorative upper surface. As viewed from the upper surface (FIGURE 19), the console includes "on-off" button 312 for operating on-off slide switch 345, a "single spare-repeat spare" button 313 for operating the "automatic" slide switch 346, and a warning light 314. The "on-off" switch is the master switch for energizing the circuitry of the present control system. The automatic switch is turned to the "on" or "repeat spare" position for the purpose of repeating the same combination of pins set by the pinsetter with each machine cycle for practice bowling purposes. The warning light or indicator indicates to the bowler when the keyboard is locked and buttons cannot be depressed for purposes of selecting a new combination of pins to be played.

"Set" button 317 operates "set" switch 347 (FIGURE 22) when the automatic switch is in the "off" or electrically closed position. The "set" switch is depressed by the bowler to clamp the pins and start or initiate loading of the turret. "Clear" button 315 is provided to clear the keyboard in a manner to be described hereinbelow.

The keyboard portion of the console includes ten keys or buttons 320, differing from each other only by numerical designations of 1 to 10 on their upper faces. Keys or buttons 320 are carried on plungers 321 and are normally urged to an upward position or raised position by means of coil springs 322 anchored on a plate member 340 and biasing buttons 320 upwardly. Each plunger 321 carries a latch member 323 pivotally mounted on the plunger and normally urged by spring 322 toward a latch or hold position. Latch members 323 are each provided with a recess 325. With buttons 320 in the raised position, latch members 323 are retained to the right as viewed in FIGURE 20, against the urging of spring 324 by means of plate member 340. When the button 320 is depressed, notch 325 becomes aligned with plate 340 and latch member 323 is urged to the left with notch 325 engaging the plate to hold the button and plunger in depressed position.

Clear button 315 is provided to permit buttons 320 to return to the raised position. Button 315 is secured to the top of plunger 331 which is spring biased by spring 332, anchored on plate 340, to a raised position. Roller 333 is rotatably mounted on and carried by plunger 331. Hold plate 341 is provided for coacting with roller 333 upon depression of button 315 for clearing the keyboard. Release plate 341 abuts each of the latch members 323 in the hold position of the latch members. Plate 341 is slidable with respect to plate 340 and is spring biased in one direction, e.g., by spring 339. Depression of button 315 causes roller 333, in engagement with cam portion 341a of plate 341 to urge plate 341 against any of the latch members 333 which are in the hold position and against the biasing of springs 324 of such latch members until notch 325 becomes disengaged from cross member 340, at which time spring 322 urges button 320 back to its raised position. Upon release of button 313, spring 339 returns plate 341 to its position providing re-engagement of notches 325 with cross member 340 as before.

Each of the buttons 320 controls one of switches PS-1 through PS-10 in accordance with the number on the upper surface of the button. With buttons 320 raised, PS-1 through PS-10 are all closed by contact with printed circuitry on the lower face of circuit board 343. The printed circuit on the lower surface of circuit board 343 corresponds to circuitry diagrammed in FIGURE 22. The switch members PS-1 through PS-10 are mounted to plungers 321 and insulated therefrom by electrical insulating means 328, e.g., a rubber grommet or the like.

Solenoid S-15 is mounted within housing 310 and is actuable to move lock plate 342 into engagement with lock recesses 326 and 327 on each of plungers 321 to lock buttons 320 in the depressed and raised positions respectively. Solenoid S-15, by means of lock plate 342, also functions to lock button 315 against depression by sliding lock plate 342 into slot 334 of plunger 331. The lock plate 342 is moved to the left as illustrated in FIGURES 20 and 21 by solenoid S-15 in order to effect the locking action. The solenoid S-15 which is a 24 volt D.C. solenoid, is energized just before turret loading begins, i.e., at the time the clamp motor is started, and remains energized until after the turret has been loaded and has dropped pins into the deck. Thus, the solenoid S-15 prevents the bowler from intentionally or unintentionally changing the selection during this period of time in order to insure correct delivery of pins to the turret and from the turret to the deck, to accurately replace the pins dropped from the normally filled deck.

Sliding of lock plate 342 controls an "anti-tease" switch 306 to close switch 306 only when the lock plate is in locking position and open switch 306 when the keyboard is unlocked. Switch 306 controls the selection circuitry (FIGURE 22) to prevent energization of the selection circuits when the keyboard is not locked. Because partially depressed keys may prevent closure of the lock plate, the arrangement assures that the selection circuitry is not energized until the keyboard is locked following completion of a selection.

Set switch button 317 is secured to the upper end of plunger 318 and is biased upwardly by spring 319 in the same manner as buttons 320 are biased upwardly. Plunger 318 works set switch 347 (FIGURE 22), included within the printed circuit on board 343 upon which contacts of the same construction as provided for PS-1 through PS-10 are adapted to rest while button 317 is in its normal raised position. Thus, switch 347 is a normally closed switch and depressing button 317 opens switch 347 until button 317 is released and the switch contacts re-engage the printed circuit.

The electrical circuitry of the specific embodiment of this invention is diagrammatically illustrated in FIGURE 22. The circuit is supplied by a power source of 230 volts A.C. applied at A and B. A conventional transformer T-1, capable of supplying about 24 volts D.C. in the secondary is included as illustrated. Additionally, a conventional circuit breaker CB is employed in the secondary of T–1.

The electric circuitry will be further discussed hereinbelow with reference to the cyclic operation of the pinsetter. According to normal operation, the machine is ready for bowling of the first of two balls at 0° of a cycle. The first ball is bowled and triggers the machine. The pin deck descends to detect for standing pins and lifts any pins remaining standing. The bottom of the detecting stroke occurs at 90° and at 180° the deck is raised carrying the lifted pins. Also at 0°, the rake starts down, sweeps the dead wood backward and is at its rearmost position at 180°. Thus, at 180° of the cycle, the rake is still down and the pins left by the first ball are lifted. Thereafter, the lifted pins are re-set and the rake comes up, the bottom of the re-set stroke occurring at 270°. The deck rises and is in its raised position at 360°.

Assuming that a second ball is to be bowled, the machine over-cycles and stops at 90° instead of stopping at 360° to await the second ball. This over-cycling eliminates the detecting portion of the cycle unnecessary after bowling a second ball thereby cutting down on pin setting time. The deck remains up while over-cycling. The second ball is bowled and triggers the machine. The rake descends and sweeps the alley. The rake is still down at 180° but thereafter rises and a new set of pins is set at 270° by the descending deck and the deck rises at 360° to await the bowling of a new first ball.

Where a strike occurs on bowling the first ball, the absence of pins is detected during the detection stroke and a new set of pins is set at 270° and the machine comes to rest at 360°.

The control system for use in the present invention places the pinsetter in a mode of operation at all times simulating that normally followed after bowling a second ball in the frame. Accordingly, the machine always over-cycles and stops at 90°, the starting point for one-ball spare bowling in accordance herewith. When the ball is then bowled it triggers the machine. In automatic operation for setting the same selective combination of pins in each successive cycle, the cycling continues past 180° and the pins are set as selected at 270° and the deck rises with the machine over cycling and stopping at 90° to await again the bowling of a ball at the selected pin combination. Where it is desired to change a selection of less than ten pins, this is done before the machine starts from 90°. After 90°, the turret indexes to receive pins for replacement of the pins in the deck to be set during the next cycle and the pattern for the next cycle set is established. The keyboard remains locked during turret indexing to prohibit making or changing a selection. Thus, if a change in selection is made before bowling, the new selection is set immediately after bowling.

During non-automatic operation, i.e., where it is desired to bowl at different combinations of pins for each successive ball, the new selection of pins is usually made each time the machine is waiting at 90°. However, where no selection is made at 90°, e.g., the operator forgets to select prior to bowling, the 180° stop solenoid S–14 is actuated and stops the machine at 180° with the rake still down prior to setting the pins, at which time a selection may be made, and the selected combination is then set.

In initiating either automatic or non-automatic selective operation in accordance herewith, the turret is first cleared of pins so that pins subsequently may be directed only to preselected pockets in the turret. This, of course, entails one cycling of the automatic pinsetter, ordinarily maintained with a full deck and a filling turret, in order to drop the ten pins from the deck and release ten pins from the turret to the deck to ready the turret for receiving preselected pins. In operation, assuming ten pins are on the alley and the pinsetter is at 0° of its cycle, referring to FIGURES 19–22, in order to ready the pinsetter for operation in selecting a predetermined combination of pins to be set up on the alley deck, the "on-off" slide switch 345 is moved to the "on" position. Relay R–1 is thereby actuated and contacts R1–1 and R1–2 open while contacts R1–3 and R1–4 close. Opening of contacts R1–1 and R1–2 isolates relay R–2 from the anti-tease switch 306. Closing of the R1–3 contacts completes the circuit from time delay 168, a thermal time delay relay with normally closed contacts 168–1, to a pinsetter re-cycle solenoid S–16, in circuit with source C, D. The re-cycle solenoid corresponds to that provided in the pinsetter as shown at 580 in the Huck et al. patent, for example. A delay of about five seconds is provided to cause the pinsetter to cycle once when switch 345 is first closed, and after such delay, contacts 168–1 open. Closing contacts R1–4 energizes the second ball solenoid S–11 located in the pinsetter, so that the pinsetter is over-cycled to 90° for second ball operation thereby to eliminate parts of the cycling normally provided for the bowling of two balls.

It will be noted that at this time there is no power to the pin selecting circuitry because the R6–2 contacts and switch 306 are open. When the pinsetter is triggered by the re-cycle solenoid, the ten pins on the alley are swept away and ten pins are set on the alley from the pin deck. At the same time the turret proceeds to load fully.

After the turret has dropped the pins to the deck in the usual manner the pinsetter completes its cycle and stops at 90°. As the turret starts to index from the #5 pin position to the #9 pin position with the turret empty, wiper 160 (FIGS. 10 and 10a) closes switch TS–11 which makes before switch TS–5 breaks and actuates relay R–4 which closes contacts R4–1 and R4–4 and opens contacts R4–2 and R4–3. Contacts R4–2 open. Contacts R4–3 open to disable contacts R6–2 from energizing the pin selection circuitry. Closing of contacts R4–4 actuates 180° stop solenoid S–14 for subsequent control to stop the pinsetter at 180° of its cycle unless disabled as explained below.

Immediately after TS–11 is closed, switch TS–12 is made by wiper 160 thereby actuating relay R–5 to close contacts R5–1, R5–3, R5–4 and R5–5 while transferring and closing the normally open contact of R5–2, a single pole, double throw switch. Such actuation of R5–2 disconnects relay R–2 from the negative side of the line and connects the deck solenoids S–1 through S–10 and relay R–7 to the negative side of the line. Closing of contacts R5–3 actuates relay R–6, thereby closing contacts R6–1, R6–2 and R6–3. Closing of contact R5–4 provides for holding in the 180° stop solenoid S–14 regardless of control by contacts R4–4. Closing contacts R5–5 energizes the #5 pin trip solenoid S–13 to lock the pin gate. Contacts R6–1 close to enable holding of relay R–6 through contacts R4–2 (now open). Contacts R6–2 close to ready actuation of solenoid S–15 through contacts R4–3 (now open). Closure of contacts R6–3 provides a by-pass around on-off switch 345 to prevent de-energizing the selection circuitry by switch 345 during loading of the turret.

The turret continues to rotate to the #9 pin position and switches TS–11 and TS–12 are broken as the wiper travels around the printed circuit in the control box to close TS–9, bringing the turret to position for awaiting loading. Relay R–4 remains energized by means of contacts R4–1, the "set" switch 347 and the first rake switch 169, a normally open switch which is held closed while the pinsetter is not cycling, i.e., stopped at 90°. Relay R–5 is still energized through contacts R5–1 and normally closed clamp switch 271.

The pinsetter, being at 90° of the cycle, is now ready for use by a bowler for bowling at a preselected spare arrangement. The bowler makes his selection on the keyboard by depressing buttons 320 as desired and thereafter either rolls a ball at the ten pins on the lane or actuates the re-cycle solenoid by means of a re-cycle button normally provided at the bowling alley in order to get his preselected spare set up on the alley.

For automatic operation wherein the preselected pattern is repeated after each ball is bowled, the automatic switch 346 is turned to the "on" position to open the switch. As the machine is triggered to set the selected complement of pins, the rake proceeds downward and the first rake switch (closed at 90 of cycle) is opened de-energizing relay R–4. Contacts R4–1 and R4–4 are opened but solenoid S–14 remains energized by means of contacts R5–4. Contacts R4–2 close to keep relay R–6 energized through contacts R6–1 while contacts R4–3 close to actuate lock plate solenoid S–15 which in turn locks the keyboard and closes switch 306 to provide power to the selection circuit. Warning light 314 goes on to indicate to the bowler that the selection circuitry is energized and the keyboard is locked.

The second rake switch (held open at 90° of cycle) closes and R–7 is thereby energized to close contacts R7–1 and start clamp motor 250.

All of the pin switches which are not depressed permit current to flow through their respective solenoids which disengage latches permitting clamp motor 250 to clamp all pins which have not been selected. Wherever a pin has been selected, the corresponding PS switch is open and no energization of the corresponding solenoid occurs.

When non-selected pins have been clamped, the clamp switch 271 opens permitting relay R–5 to open thereby opening contacts R5–1, R5–3, R5–4 and R5–5 while returning R5–2 to its normally closed pole. This results in de-energization of the 180° stop solenoid S–14 and the #5 pin trip solenoid S–13. The pin gate is thereby unlocked.

The turret next begins to selectively load in order to replace pins that are being set. As the turret switch is scanned, the wiper 160 passes over and closes TS–9, TS–10, TS–6, TS–3, TS–1, TS–2, TS–4, TS–7 and TS–8 in that order. These segments or contacts are "make before break" contacts. If a button is depressed, the turret stops and awaits a pin in normal pin loading manner. If the button is not depressed, relay R–2 is energized through closed TS and PS switches in series which actuates turret index solenoid S–12 and the turret indexes without receiving a pin. The wiper continues to TS–5, "break before make" between TS–8 and TS–11, and upon reaching the #5 pin position if the #5 button is depressed, the turret stops and waits for a pin. If the #5 button is not depressed, R–3 is actuated by TS–5 and contacts R3–2 close to energize the #5 pin trip solenoid S–13 and the spider is thereby tripped to set the selected pins on the alley and energization of the solenoid causes the selected pins to drop from the turret to the deck. Contacts R3–1 are opened.

Next the turret advances from the #5 to the #9 position and TS–11 is closed actuating relay R–4. R4–2 and R4–3 are opened permitting de-energizing relay R–6 and removing power from the lock solenoid S–15 and selecting circuit and de-energizing relay R–7 to unclamp the pins in the deck. TS–12 is then made energizing relay R–5. Contacts R5–1 and R5–3 close, the latter re-energizing relay R–6. Contacts R5–2 switch to connect relay R–7 and the deck solenoids to the negative side of the line. Contacts R5–4 close. Relay R–5 holds in as TS–12 is broken by progression of the wiper because the deck is now unclamped and clamp switch 271 is in closed position.

The above completes a cycle of operation with the automatic switch 346 closed. Upon bowling a ball, the preselected pins will automatically again be set and the cycle will be repeated each time a ball is bowled.

Where the control circuitry is operated with the automatic switch 346 in closed or "off" position, the cycle is exactly the same except that the set switch 347 must be depressed and opened to cause clamping of the pins and starting of turret loading. If the set switch 347 is not depressed before triggering the machine to move from its 90° waiting position, a 180° stop will occur due to solenoid S–14 being energized and the machine will wait at 180° for the bowler to make a selection and press the set button. If the set button is depressed while the machine is waiting at 90° of cycle, before bowling at the setup then on the lane, the selection having been made at that time, no stop is made at 180°. Thus, 180° stop solenoid S–14 is used to stop the pin setting machine after 180° of cycle whenever a selection is not on the keyboard, i.e., where a selection of a different combination of pins is to be made between the bowling of each ball and has not been made. It will be recalled that while the pinsetter is at 180° of cycle the rake is down; in non-automatic operation the stop is made at this time so that the bowler will be reminded to make his selection.

Relay R–6 has two important functions. As described above, this relay is employed to prevent selective loading of the turret when switch 345 is first turned on. Thus, the turret is allowed to load fully the first time so that a full complement of pins can be maintained in the deck. The second purpose of relay R–6 is to prevent loss of memory from the selection circuitry if switch 345 is turned off while the turret is receiving a pin selction to replace pins set from the deck. If switch 345 is turned off, electrical contact still remains by way of contacts R6–3 and the cycle will continue normally until TS–11 is made which opens contacts R4–2 to de-energize relay R–6 causing loss of power to the system through opening of contacts R6–3.

Direct current blocking diodes D–1 through D–10 are provided in the circuitry of FIGURE 22 to prevent current from flowing through the common solenoid line upon closure of any of the TS switches during movement of the wiper for selective loading of the turret.

A jumper 307 is provided in series in the circuitry to relay R–1, the relay which energizes the "spare" setting sequence by actuation through switch 345. The jumper is in an otherwise conventional disconnect plug provided in the bowlers' console for putting the keyboard controls in the circuit. The purpose of the jumper is to prevent pin jams if the console is unplugged while the turret is receiving pins. Accordingly, when the console is unplugged, the jumper is also thereby disconnected and power is lost to relay R–1, causing contacts R1–1 and R1–2 to close energizing relay R–2 (via R6–2, R6–3 and R4–3). The turret then continues indexing without receiving pins until it reaches the #5 pin position, whereupon relay R–3 is closed through R1–2 and TS–5. Contacts R3–1 are thereby opened releasing the turret index and tripping the spider. Then TS–11 is closed which shuts off the system.

I claim:
1. A bowling pin handling apparatus, comprising, a deck structure having means for receiving and holding bowling pins at positions in a predetermined pattern thereon preparatory to release of the pins to drop therebeneath for setup on a pin supporting surface, a pin conveyor mechanism for transporting pins serially to a pin delivery station, a normally empty indexable pin distributor for receiving pins one at a time at said pin delivery station and distributing the pins respectively to the positions on the deck structure, means for operating the conveyor and distributor in timed relationship normally to deliver pins to each of the positions on the deck structure thereby to fill the deck structure, means for operating the deck structure normally to release each of the pins therein to drop therebeneath for setup, selectively operable means for holding preselected pins on the deck structure during the release operation thereby to drop only the unheld pins, selectively operable means for operating the conveyor and distributor in timed relationship to deliver pins only to positions on the deck structure to replace those selectively dropped by the deck structure, and remote control means for conditioning both selectively operable means to control the conveyor, distributor and deck structure.

2. A bowling pin handling apparatus comprising, a normally full pin setting deck structure having means for receiving and holding bowling pins thereon preparatory to delivery of the pins to a pin supporting surface, a normally empty indexable receiver having a plurality of pin receptacles arranged to move successively past a pin receiving station and adapted to deliver pins to said pin deck, pin delivery means for delivering pins successively to preselected receptacles in said indexable receiver for subsequent delivery to said deck means while maintaining the receiver otherwise empty and control means adapted to hold other pins in said deck means during delivery of pins from preselected receptacles to the bowling alley.

3. A bowling pin handling apparatus comprising, a pin deck structure movable toward and away from a pin supporting surface on a bowling alley, means on the deck structure for receiving and holding bowling pins at positions in a predetermined pattern thereon preparatory to release of the pins to drop therebeneath for setup on said pin supporting surface, an indexable receiver having a plurality of pin receptacles arranged to move successively past a pin receiving station and adapted to deliver pins to said pin deck structure, pin delivery means for delivering pins to said receptacles in said indexable receiver for subsequent delivery to said deck structure, clamp means capable of holding pins in said deck structure during normal operation of said deck structure for release of pins to the pin supporting surface, selection means for selecting a pattern of bowling pin desired to be deposited on the bowling alley and control means responsive to the selection means for controlling the pin delivery means and clamp means, including pin delivery control means for actuating said pin delivery means to deliver pins solely to pin receptacles in said receiver corresponding to pin positions of said pattern and clamp control means for actuating said clamp means to hold all pins in said deck means except the pins in pin positions corresponding to said said pattern.

4. The apparatus of claim 3 wherein said clamp means includes a pin-engaging arm pivotally mounted at each pin position and a spring biasing the pin engaging arm away from pin-holding position.

5. A bowling pin handling apparatus, comprising, a pin setting deck structure movable toward and away from a pin supporting surface on a bowling alley and having means for receiving and holding bowling pins at positions in a predetermined pattern thereon preparatory to release of the pins to drop therebeneath for setup on said pin supporting surface, a pin conveyor for transporting pins serially to a pin delivery position, an indexable turret having pin receiving pockets corresponding respectively to pin positions on said deck structure and indexable successively to said pin delivery station for receiving pins from the conveyor, means for operating the conveyor and turret in timed relationship normally to deliver pins to each of the pockets in the turret, means for operating the turret to drop each of the pins held thereby to the deck structure therebelow, means for operating the deck structure normally to drop each of the pins held thereby to the pin supporting surface therebelow, means for selectively operating the deck structure to drop only preselected pins to the pin supporting surface therebeneath, and means for selectively operating the conveyor and turret in timed relationship to deliver only corresponding preselected pins to the turret for refilling the deck structure.

6. An automatic pinsetter for tenpin bowling play comprising, a deck for setting tenpins on a bowling alley floor, a revolvable turret having nine tenpin baskets and a chute for individually receiving a tenpin and releasing same to said deck, conveyor means for feeding a tenpin to each turret basket and said turret chute as said turret indexes to position said baskets and chute individually under said conveyor, an indexing cam operatively associated with said turret and having ten dwells individually correlated with respective ones of said baskets and said chute, stop lever means having a follower riding along said index cam, trip lever means operatively regulating said stop lever means to permit its follower to leave one dwell and enter the next dwell as said turret indexes to position said basket and chute individually under said conveyor, said stop lever means normally latching said turret when said stop lever follower engages a dwell as said turret indexes to position the corresponding basket or chute under said conveyor means for feeding a tenpin thereto, said trip lever means being actuated by the feed of a tenpin to said turret to actuate said stop lever follower to leave one indexing cam dwell and to enter the next dwell whereby said turret indexes, a source of voltage, solenoid means, an indexing trip lever link operated by said solenoid and connected to said trip lever means, said indexing trip lever being responsive to energization of said solenoid means for positive movement in a direction to actuate said trip lever means without a tenpin actuating same to cause said turret to index from one dwell to the next, and switch means connecting said solenoid means to said source for selectively energizing said solenoid means in correlation with turning of said turret, said switch means comprising a rotary switch having at least nine wiper contacts individually correlated with the indexing cam dwells of each of said baskets and an operatively associated wiper arm, said arm being connected to said source, said arm turning with said turret to contact individual ones of said wiper contacts in correlation with turret indexing from one dwell to the next, and a plurality of switch means individually in series with said wiper contacts for selectively completing electrical connection of said individual wiper contacts with said solenoid means wherein said solenoid means may be selectively energized to index a given one or more of said baskets, one at a time away from under said conveyor means.

7. A bowling pin handling apparatus comprising, pin conveyor and delivery means, an indexable pin receiver having a plurality of pin receptacles arranged to move successively past a pin receiving station, said pin conveyor and delivery means being adapted to deliver pins successively at said pin receiving station to receptacles in the indexable receiver, a pin deck structure movable toward and away from a pin supporting surface on a bowling alley and having means for receiving and holding bowling pins at positions in a predetermined pattern thereon preparatory to release of the pins to drop therebeneath for setup on said pin supporting surface, said pin deck being disposed to receive pins from said receiver receptacles and adapted to set pins in a preselected pin pattern of less than ten pins on a bowling alley, means for controlling said delivery means and receiver to convey pins solely to preselected receptacles of the pin receiver corresponding to said preselected pattern of less than ten pins while maintaining said receiver otherwise empty, clamp means on said pin deck structure for selectively releasing only pins of said pattern to the pin supporting surface, and means controlling said pin receiver for dropping pins from the preselected receptacles to the deck means after setting of the pattern of pins on the bowling alley by the deck means.

8. A bowling pin handling apparatus, comprising, a pin setting deck structure movable toward and away from a pin supporting surface on a bowling alley and having means for receiving and holding bowling pins at positions in a predetermined pattern thereon preparatory to release of the pins to drop therebeneath for setup on said pin supporting surface, a pin conveyor for transporting pins serially to a pin delivery position, an indexable turret having pin receiving pockets corresponding respectively to pin positions on said deck structure and indexable successively to said pin delivery station for receiving pins from the conveyor, means for operating the conveyor and turret in timed relationship normally to deliver pins to each of the pockets in the turret, means for operating the turret to drop each of the pins held thereby to the deck structure therebelow, means for operating the deck structure normally to drop each of the pins held thereby to the pin supporting surface therebelow, selectively operable means for holding preselected pins on the deck structure thereby to drop only the unheld pins during the pin release operation, selectively operable means for operating the conveyor and turret in timed relationship to deliver only pins to the turret to refill the deck structure, and a remote control for energizing both selectively operable means.

9. A bowling pin handling apparatus comprising, an indexable receiver having a plurality of pin receiving pockets arranged in predetermined positions to move successively past a pin receiving station, conveyor means having a discharge end disposed to deliver pins successively to the receiver pockets at the pin receiving station, and means for controlling the delivery means and pin receiver comprising a plurality of circular arrays of electrical contacts, a wiper assembly rotatably mounted to track said circular arrays and having electrically conductive wiper means traversing said electrical contacts for completion of electrical circuits between said arrays, a driving connection between said receiver and wiper means for driving said wiper means by said receiver, electrically energizable motor means adapted to cause indexing of non-preselected receptacles of said receiver past said pin receiving station and adapted to block said delivery means responsive to electrical contact through said wiper means during such indexing past said pin receiving station, said circular arrays of contacts including a set of contacts arranged to be closed by said wiper means corresponding to each of said receptacles while the receptacle is in pin receiving position at the pin receiving station, and means for selectively breaking the circuit between said motor means and any of said sets of contacts, the breaking of the circuit between the motor means and any set of contacts resulting in selection of the corresponding receptacle as one of the preselected receptacles.

10. A bowling pin handling apparatus comprising, a pin setting deck structure movable toward and away from a pin supporting surface on a bowling alley, means on the deck structure for receiving and holding bowling pins at positions in a predetermined pattern thereon preparatory to release of the pins to drop therebeneath for setup on said pin supporting surface, means for operating said receiving and holding means normally to release and drop each of the pins held thereby, means on the deck structure for normally picking up and resetting pins on said pin supporting surface, selectively operable means for controlling said receiving and holding means to set only preselected pins and means responsive to operation of said controlling means for eliminating the picking up and resetting operation of said picking up and resetting means.

11. A bowling pin handling apparatus, comprising, a pin setting deck structure movable toward and away from a pin supporting surface on a bowling alley, means on the deck structure for receiving and holding bowling pins at positions in a predetermined pattern thereon preparatory to release of the pins to drop therebeneath for setup on said pin supporting surface, means for operating said receiving and holding means normally to release and drop each of the pins held thereby, means on the deck structure for picking up and resetting pins on said pin supporting surface, selectively operable control means including means on said deck structure for holding preselected pins on the deck structure thereby to set only the unheld pins upon release of pins by said receiving and holding means, and means for eliminating the picking up and resetting operation of said picking up and resetting means responsive to an operation of said control means for setting less than ten pins.

12. A bowling pin handling apparatus, comprising, a pin setting deck structure movable toward and away from a pin supporting surface on a bowling alley, means on the deck structure for receiving and holding bowling pins at positions in a predetermined pattern thereon preparatory to release of the pins to drop therebeneath for setup on said pin supporting surface, means for operating said receiving and holding means to release and normally drop each of the pins held thereby, and selectively operable means on said deck structure for holding preselected pins released by said receiving and holding means on the deck structure thereby to set only the unheld pins upon release of pins by said receiving and holding means.

13. The combination defined in claim 12, wherein said last recited means comprises a plurality of clamps, one associated with each pin position on the deck structure, for holding pins on the deck structure during pin release by said receiving and holding means, and means for selectively actuating the clamps.

14. In a pin setting apparatus wherein bowling pins are conveyed and delivered by a pin conveying and delivering mechanism to a pin receiver having a plurality of pin receptacles and wherein the pins are received and deposited upon the bowling alley from the pin receptacles by a pin deck structure movable toward and away from a pin supporting surface on a bowling alley and having means for receiving and holding bowling pins at positions in a predetermined pattern thereon preparatory to release of the pins to drop therebeneath for setup on said pin supporting surface, the improvement which comprises means for selectively delivering pins only to preselected receptacles while maintaining the pin receiver otherwise empty, means for delivering pins from the preselected receptacles to said pin deck structure, means operable separately of said receiving and holding means controlling the pin deck structure at each pin position for selectively depositing said pins from said preselected pin receptacles on the pin supporting surface while maintaining said pin deck structure otherwise full of pins, switch means for selecting said preselected receptacles, and electrical control circuitry for energizing or de-energizing each of said controlling means at each pin position responsive to said switch means.

15. The pin setting apparatus of claim 14, including a selectively operable "on-off" switch in said circuit controlling energization thereof and means in said circuit energizable on energization of the circuit and adapted for connection with the pinsetting apparatus to place the apparatus in a second ball mode of operation on energization of the circuit.

16. The pin setting apparatus of claim 14, including a selectively operable "on-off" switch in said circuit controlling energization thereof and said selector switch means is adapted to hold and remember the selection given thereto for automatic repetition of the selection in each subsequent cycle of the pin setting apparatus.

17. An automatic pinsetter for tenpin bowling play comprising, a deck of setting tenpins on a bowling alley floor, a revolvable turret having a plurality of storage bins for individually receiving a tenpin and releasing same to said deck, conveyor means for feeding a tenpin to each turret bin as said turrent indexes to position said bins individually under said conveyor, an indexing cam operatively associated with said turret and having a plurality of dwells individually correlated with a respective one of said bins, pin gate means alternately operable to permit the feed of tenpins from said conveyor to said turret and to block the feed of tenpins to said turret, stop lever means having a follower riding along said index cam, a pin gate latch link controlled by said stop lever means, said stop lever means assuming operative positions in accordance with the position of its follower along said index cam, said pin gate latch link being responsive to the operative positions of said stop lever, means for regulating said pin gate means to permit the feed of a tenpin to said turret after said stop lever means follower enters an index cam dwell during turret indexing, a source of voltage, solenoid means, a pin gate solenoid link responsive to energization of said solenoid means and operatively connected to said pin gate latch link, said pin gate solenoid link undergoing positive movement upon energization of said solenoid to move said pin gate latch link in a direction to prevent same acting upon said pin gate means, wherein said pin gate means is operated to prevent the feed of a tenpin from said conveyor to said turret, and switch means connecting said solenoid means to said voltage source for selectively energizing solenoid means in correlation with turning of said turret, said solenoid means being energized to prevent the feed of a tenpin to at least a selected one of said bins, said switch means comprising a rotary switch having ten wiper contacts and an operatively associated wiper arm, said arm being connected to said source, said arm turning with said turret to contact individual ones of said wiper contacts in correlation with turret indexing from one dwell to the next, and a plurality of switch means individually in series with said wiper contacts for selectively completing the electrical connection of said individual wiper contacts with said solenoid means, wherein said solenoid means may be selectively energized with respect to a given one or more of said turret bins one at a time.

18. A bowling pin handling apparatus comprising a pinsetting deck structure movable toward and away from a pin supporting surface on a bowling alley, means on the deck structure for receiving and holding bowling pins at positions in a predetermined pattern thereon preparatory to release of the pins to drop therebeneath for setup on said pin supporting surface, means for operating said receiving and holding means to release and normally drop each of the pins held thereby, and means on said deck structure operable separately of said receiving and holding means for holding preselected pins ond the deck structure thereby to set only the unheld pins upon release of pins by said receiving and holding means.

References Cited by the Examiner
UNITED STATES PATENTS

| | | | |
|---|---|---|---|
| 1,468,212 | 9/1923 | Redfield | 273—43 |
| 2,017,143 | 10/1935 | Bentz | 273—43 |
| 2,319,925 | 5/1943 | Flanagan | 273—43 |
| 2,641,471 | 6/1953 | Timberlake | 273—43 |
| 2,949,300 | 8/1960 | Huck et al. | 273—43 |

DELBERT B. LOWE, *Primary Examiner.*